US012756143B2

(12) United States Patent
Yamauchi et al.

(10) Patent No.: US 12,756,143 B2
(45) Date of Patent: Oct. 6, 2026

(54) CONNECTOR DEVICE

(71) Applicant: I-PEX Inc., Kyoto (JP)

(72) Inventors: Takao Yamauchi, Machida-city (JP); Sho Suzuki, Machida-city (JP); Yuki Miyazaki, Ogori (JP)

( * ) Notice: Subject to any disclaimer, the term of this patent is extended or adjusted under 35 U.S.C. 154(b) by 288 days.

(21) Appl. No.: 18/731,516

(22) Filed: Jun. 3, 2024

(65) Prior Publication Data

US 2024/0322498 A1 Sep. 26, 2024

Related U.S. Application Data

(63) Continuation of application No. 17/561,711, filed on Dec. 24, 2021, now Pat. No. 12,034,255, which is a (Continued)

(30) Foreign Application Priority Data

Jul. 4, 2019 (JP) ................................ 2019-125583
Jul. 4, 2019 (JP) ................................ 2019-125584
Oct. 8, 2019 (JP) ................................ 2019-185407

(51) Int. Cl.
*H01R 12/71* (2011.01)
*H01R 13/6585* (2011.01)

(52) U.S. Cl.
CPC ....... *H01R 13/6585* (2013.01); *H01R 12/716* (2013.01)

(58) Field of Classification Search
CPC .. H01R 13/6585; H01R 12/716; H01R 12/57; H01R 13/6594; H01R 13/646; H01R 13/42; H01R 12/72
See application file for complete search history.

(56) References Cited

U.S. PATENT DOCUMENTS 7,207,842 B1 * 4/2007 Kenjo .................... H01R 12/79 439/74
7,494,346 B1 * 2/2009 Peng .................... H01R 12/716 439/74
(Continued)

FOREIGN PATENT DOCUMENTS

CN 2802786 8/2006
CN 101149395 3/2008
(Continued)

OTHER PUBLICATIONS

International Search Report dated Aug. 18, 2020 for PCT/JP2020/021576.
(Continued)

*Primary Examiner* — Abdullah A Riyami
*Assistant Examiner* — Nelson R. Burgos-Guntin
(74) *Attorney, Agent, or Firm* — SHIPWAY IP

(57) ABSTRACT

A connector device comprising a first connector and a second connector. The first connector comprises: a plurality of conductive first contacts; an insulating first contact holding portion holding the plurality of first contacts; a conductive partition wall partitioning the first contact holding portion into a first grouping area that holds two or more first contacts and a first individual area that holds one first contact; and a conductive first surrounding wall disposed around an outer periphery of the first individual area so that the first surrounding wall and the partition wall at least partially surround the first individual area. The second connector comprises: a plurality of conductive second contacts; and a conductive second surrounding wall. When the first connector and the second connector are fitted to each other, the second surrounding wall is disposed inside or outside the first surrounding wall around the outer periphery of the first individual area.

20 Claims, 23 Drawing Sheets

Related U.S. Application Data continuation of application No. PCT/JP2020/021576, filed on Jun. 1, 2020.

(56) References Cited

U.S. PATENT DOCUMENTS

| | | | | |
|---|---|---|---|---|
| 2005/0142909 | A1* | 6/2005 | Akasaka | H01R 13/6585 439/108 |
| 2006/0141811 | A1* | 6/2006 | Shichida | H01R 24/50 439/63 |
| 2008/0076298 | A1 | 3/2008 | Matsumura et al. | |
| 2010/0330821 | A1* | 12/2010 | Takeuchi | H01R 13/26 439/65 |
| 2011/0312221 | A1* | 12/2011 | Takeuchi | H01R 12/716 439/626 |
| 2012/0231637 | A1 | 9/2012 | Takeuchi et al. | |
| 2013/0012039 | A1 | 1/2013 | Nose et al. | |
| 2013/0089991 | A1 | 4/2013 | Ito | |
| 2013/0210270 | A1* | 8/2013 | Takeuchi | H01R 12/73 439/488 |
| 2013/0244486 | A1 | 9/2013 | Ohsaka | |
| 2013/0309881 | A1 | 11/2013 | Tagawa et al. | |
| 2013/0330943 | A1* | 12/2013 | Sasaki | H01R 12/716 439/74 |
| 2014/0295702 | A1 | 10/2014 | Tamai et al. | |
| 2014/0364003 | A1* | 12/2014 | Yunoki | H01R 12/716 439/374 |
| 2015/0079816 | A1* | 3/2015 | Suzuki | H01R 13/6275 439/74 |
| 2015/0140840 | A1 | 5/2015 | Nishimura et al. | |
| 2015/0140841 | A1 | 5/2015 | Watanabe | |
| 2015/0214643 | A1* | 7/2015 | Lee | H01R 12/716 439/655 |
| 2015/0357735 | A1 | 12/2015 | Uratani | |
| 2016/0226173 | A1 | 8/2016 | Miyazaki | |
| 2017/0033510 | A1 | 2/2017 | Ozeki | |
| 2018/0054013 | A1 | 2/2018 | Osaki et al. | |
| 2018/0198241 | A1 | 7/2018 | Ooi | |
| 2018/0198242 | A1 | 7/2018 | Chuang | |
| 2018/0205165 | A1* | 7/2018 | Hoshiba | H01R 12/716 |
| 2018/0287282 | A1 | 10/2018 | Horino et al. | |
| 2019/0052002 | A1* | 2/2019 | Hasegawa | H01R 12/716 |
| 2020/0295497 | A1 | 9/2020 | Suzuki | |
| 2021/0111521 | A1 | 4/2021 | Amemori et al. | |
| 2021/0119386 | A1 | 4/2021 | Lee et al. | |
| 2021/0175649 | A1 | 6/2021 | Amemori et al. | |
| 2021/0175666 | A1 | 6/2021 | Zhang et al. | |
| 2022/0123508 | A1 | 4/2022 | Yamauchi et al. | |
| 2023/0144353 | A1 | 5/2023 | Oh et al. | |

FOREIGN PATENT DOCUMENTS

| | | |
|---|---|---|
| CN | 101911397 | 2/2013 |
| CN | 103036081 | 4/2013 |
| CN | 104078799 | 10/2014 |
| CN | 207338827 | 5/2018 |
| CN | 109478739 | 3/2019 |
| CN | 208674425 | 3/2019 |
| EP | 0601265 | 6/1994 |
| EP | 3051634 | 8/2016 |
| JP | H11-329594 | 11/1999 |
| JP | 2006-085944 | 3/2006 |
| JP | 2021-093346 | 6/2021 |
| WO | 2007/063636 | 6/2007 |
| WO | 2009/061507 | 5/2009 |
| WO | 2015/045623 | 4/2015 |
| WO | 2017/053149 | 3/2017 |
| WO | 2018/230158 | 12/2018 |
| WO | 2020/003731 | 1/2020 |
| WO | 2020/039666 | 2/2020 |
| WO | 2020/040004 | 2/2020 |
| WO | 2021/002129 | 1/2021 |

OTHER PUBLICATIONS

International Preliminary Report on Patentability with Written Opinion dated Jan. 13, 2022 for PCT/JP2020/021576.

* cited by examiner

CONNECTOR DEVICE

CROSS-REFERENCE TO RELATED APPLICATIONS

This application is a continuation application of U.S. patent application Ser. No. 17/561,711, filed on Dec. 24, 2021, which is a continuation application of PCT Application No. PCT/JP2020/021576, filed on Jun. 1, 2020, which claims the benefit of priority from Japanese Patent Application No. 2019-125583, filed on Jul. 4, 2019, Japanese Patent Application No. 2019-125584, filed on Jul. 4, 2019, and Japanese Patent Application No. 2019-185407, filed on Oct. 8, 2019, the entire contents of which are incorporated herein by reference.

BACKGROUND

Field

International Publication No. 2015/045623 discloses a connector including a first connector and a second connector. The first connector includes a first insulator, a plurality of first contacts supported by the first insulator, and a conductive member supported by the first insulator. The second connector includes a second insulator and a plurality of second contacts supported by the second insulator. A conductive member shielding portion is provided on an outer peripheral wall of the first insulator. In a state in which the first connector mounted on a first circuit board is connected to the second connector mounted on a second circuit board, the conductive member shielding portion is located between the first circuit board and the conductive member or between the second circuit board and the conductive member.

SUMMARY

Disclosed herein is an example connector device. The connector device may comprise a first connector and a second connector. The first connector may comprise: a plurality of conductive first contacts configured to be respectively connected to a plurality of conductors of a first board; an insulating first contact holding portion holding the plurality of first contacts; a conductive partition wall partitioning the first contact holding portion into a first grouping area that holds two or more first contacts and a first individual area that holds one first contact and does not hold another first contact. wherein the partition wall is configured to be electrically connected to a ground conductor of the first board; and a conductive first surrounding wall disposed around an outer periphery of the first individual area so that the first surrounding wall and the partition wall at least partially surround the first individual area, wherein the first surrounding wall is configured to be electrically connected to the ground conductor of the first board. The second connector may comprise: a plurality of conductive second contacts configured to be respectively connected to a plurality of conductors of a second board and respectively contact the plurality of first contacts when the first connector and the second connector are fitted to each other; and a conductive second surrounding wall configured to be electrically connected to a ground conductor of the second board. When the first connector and the second connector are fitted to each other, the second surrounding wall may be disposed inside or outside the first surrounding wall around the outer periphery of the first individual area.

Additionally, an example connector device is disclosed herein. T connector device may comprise a first connector and a second connector. The first connector may comprise: a plurality of conductive first contacts configured to be respectively connected to a plurality of conductors of a first board; an insulating first contact holding portion holding the plurality of first contacts; a conductive partition wall partitioning the first contact holding portion into a first grouping area that holds three or more first contacts, and a first individual area that holds a pair of first contacts for transmitting one signal and does not hold another first contact, wherein the partition wall is configured to be electrically connected to a ground conductor of the first board; and a conductive first surrounding wall disposed around an outer periphery of the first individual area so that the first surrounding wall and the partition wall at least partially surround the first individual area, wherein the first surrounding wall is configured to be electrically connected to the ground conductor of the first board. The second connector may comprise: a plurality of conductive second contacts configured to be respectively connected to a plurality of conductors of a second board and respectively contact the plurality of first contacts when the first connector and the second connector are fitted to each other; and a conductive second surrounding wall configured to be electrically connected to a ground conductor of the second board. When the first connector and the second connector are fitted to each other, the second surrounding wall may be disposed inside or outside the first surrounding wall around the outer periphery of the first individual area.

DETAILED DESCRIPTION

In the following description, with reference to the drawings, the same reference numbers are assigned to the same components or to similar components having the same function, and overlapping description is omitted.

Connector Device

Figure 1:
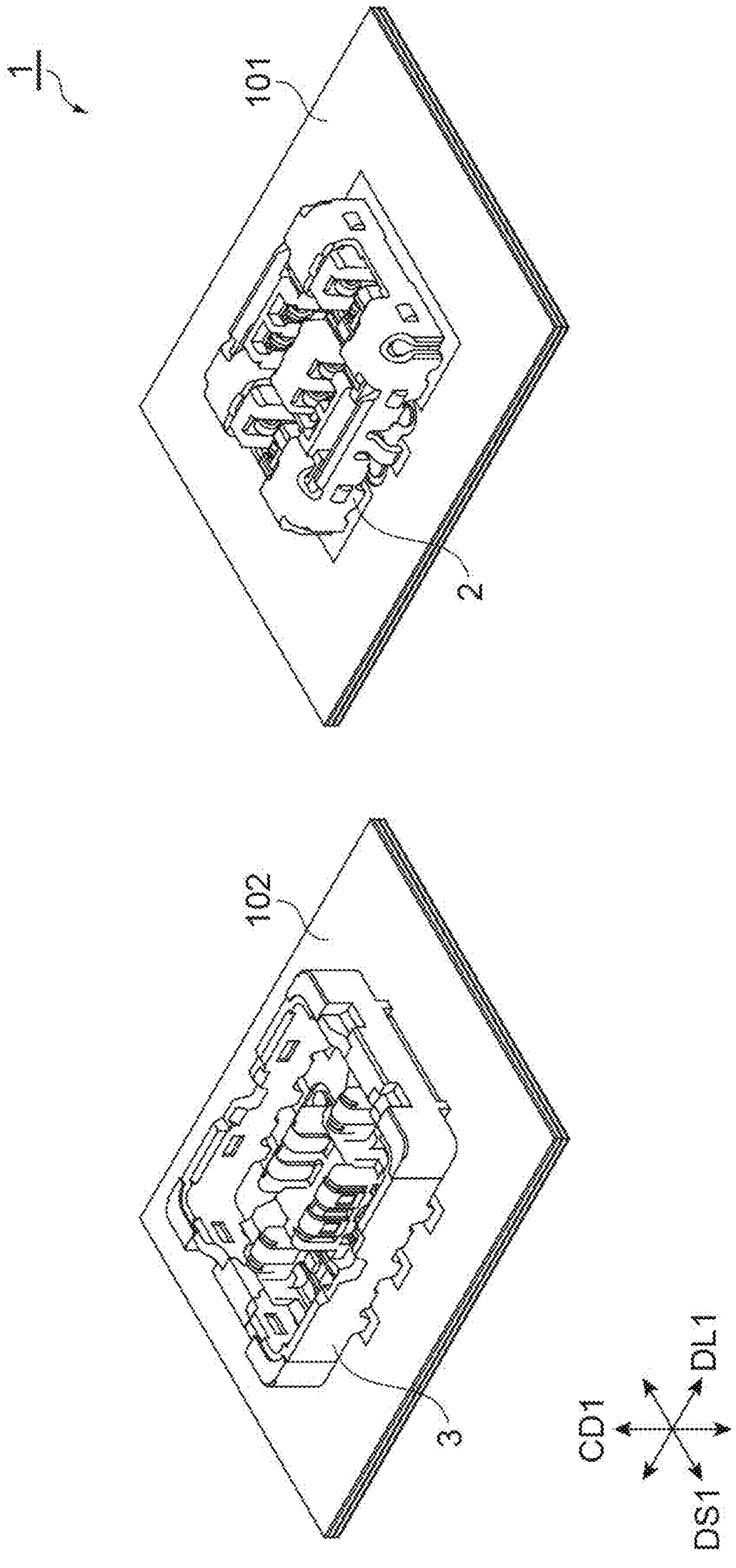
FIG. 1 is a perspective view illustrating an example of a connector device.

An example connector device 1 illustrated in FIG. 1 is a device used for connection between circuit boards (hereinafter, also simply referred to as "board") in an electronic device. Examples of the electronic device include a mobile communication terminal such as a mobile phone, a smartphone, a laptop computer, or a tablet computer, but the electronic device is not limited thereto.

As illustrated in FIG. 1, the connector device 1 includes a receptacle connector 2 and a plug connector 3 which are respectively attached to two circuit boards 101 and 102 to be connected. A circuit board 101 and a circuit board 102 are electrically connected by fitting the receptacle connector 2 and the plug connector 3.

In a state in which the receptacle connector 2 and the plug connector 3 are disposed so as to fit to each other, the shape of the plug connector 3 viewed from the receptacle connector 2 and the shape of the receptacle connector 2 viewed from the plug connector 3 are both approximate a rectangle. Hereinafter, the direction along the long side of the rectangle is referred to as a long side direction DL1, and the direction along the short side of the rectangle is referred to as a short side direction DS1. The direction perpendicular to the rectangle is referred to as a connection direction CD1 of the receptacle connector 2 and the plug connector 3. Hereinafter, in a state where the receptacle connector 2 and the plug connector 3 are disposed so as to fit to each other, when describing the structure of the plug connector 3 viewed from the receptacle connector 2, it is simply referred to as "viewed from the receptacle connector 2", and when describing the structure of the receptacle connector 2 viewed from the plug connector 3, it is simply referred to as "viewed from the plug connector 3".

Receptacle Connector

Figure 2:
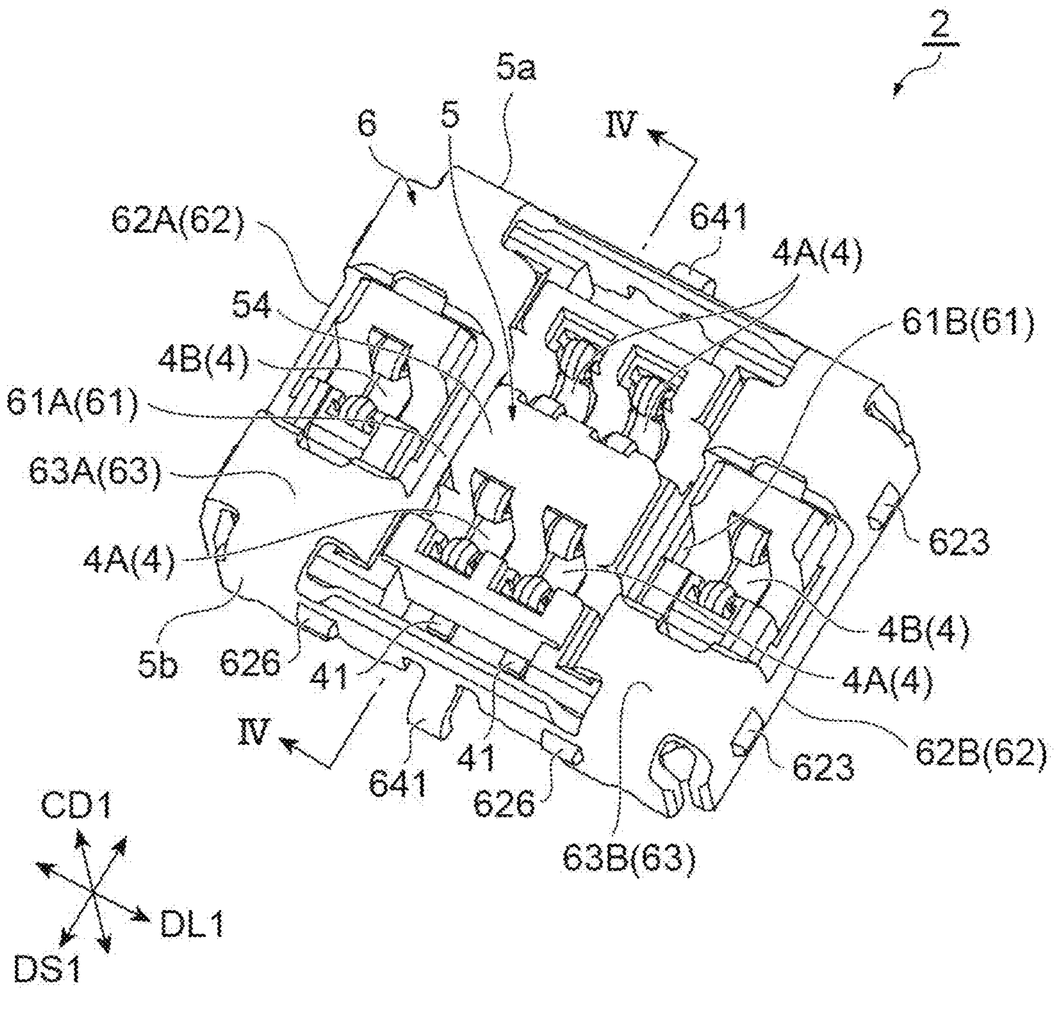
FIG. 2 is a perspective view illustrating an example of a receptacle connector.
Figure 3:
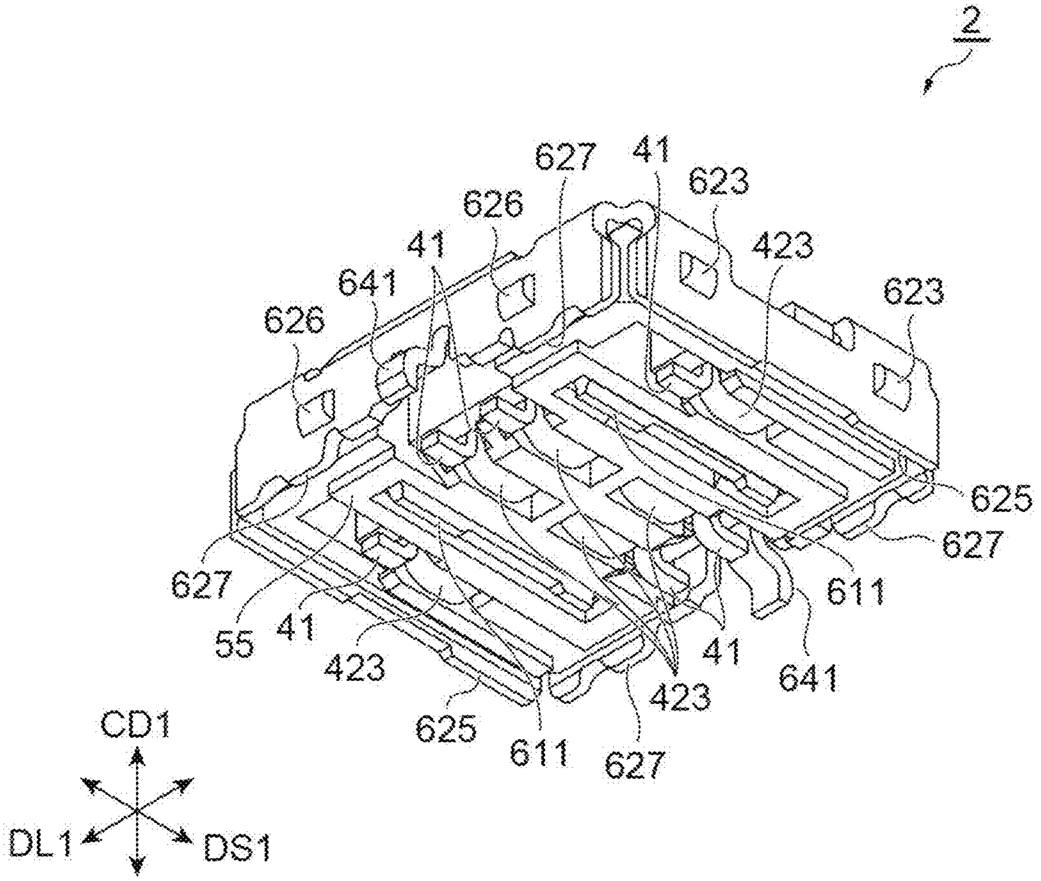
FIG. 3 is a perspective view of the receptacle connector from another direction.
Figure 4:
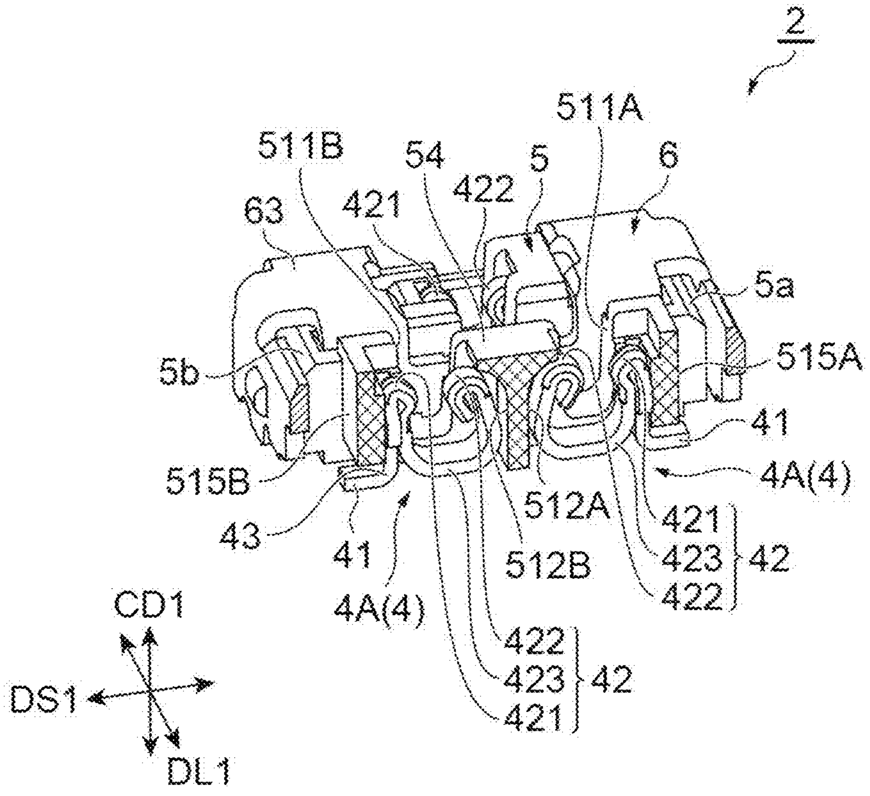
FIG. 4 is a perspective view of the receptacle connector illustrating a cross-section along line IV-IV in FIG. 2.

First, the configuration of the receptacle connector 2 will be described in detail. As described above, the receptacle connector 2 is attached to the circuit board 101 and connected to the plug connector 3, which is a mating connector. As illustrated in FIG. 2 to FIG. 4, the receptacle connector 2 includes a plurality of conductive contacts 4, a contact holding portion 5, and a shell 6.

A plurality of contacts 4 are connected to the plurality of conductors of the circuit board 101, respectively, and sandwich a plurality of contacts 7 (described below) of the plug connector 3, respectively, to contact each of the contacts 7, respectively. The plurality of contacts 4 may include contacts 4 of different types. For example, the plurality of contacts 4 include a plurality of first type contacts 4A and at least one second type contact 4B of a type different from a first type contact 4A. As an example, the receptacle connector 2 include six contacts 4, and the six contacts 4 include four first type contacts 4A and two second type contacts 4B.

"Of different types" means belonging to different types from each other under some definition specifying a difference in type. Examples of the difference in type include a difference in frequency band of a signal to be transmitted, a difference in allowable current, a difference in allowable voltage, and a difference in connection of a signal conductor (conductor constituting a part of a signal circuit) or a ground conductor (conductor constituting a part of a ground circuit). As an example, the second type contact 4B are contacts that transmit higher frequency signals compared to signals transmitted by the first type contact 4A.

As illustrated in FIG. 4, each of the six contacts 4 has a connecting portion 41, a contact portion 42, and a linking portion 43. The connecting portion 41 is connected to a conductor (for example, a signal conductor) of the circuit board 101. The contact portion 42 contacts a contact 7 (described below) of the plug connector 3. The connecting portion 41 and the contact portion 42 are linked to each other.

The contact portion 42 includes a first portion 421, a second portion 422, and a linking portion 423. The first portion 421 and the second portion 422 protrude toward the plug connector 3 along the connection direction CD1 and sandwich the contact 7 of the plug connector 3. The linking portion 423 links the base of the first portion 421 and the base of the second portion 422.

The linking portion 43 links the connecting portion 41 and the base of the contact portion 42. The connecting portion 41 extends outward from the base of the first portion 421 in a direction opposite to the linking portion 423. The contact 4 is formed by punching a sheet of plate material from a metallic thin plate and bending the punched plate material. The connecting portion 41 may have any shape as long as it can be attached to the circuit board 101, and may have a shape that does not protrude outward.

Figure 5:
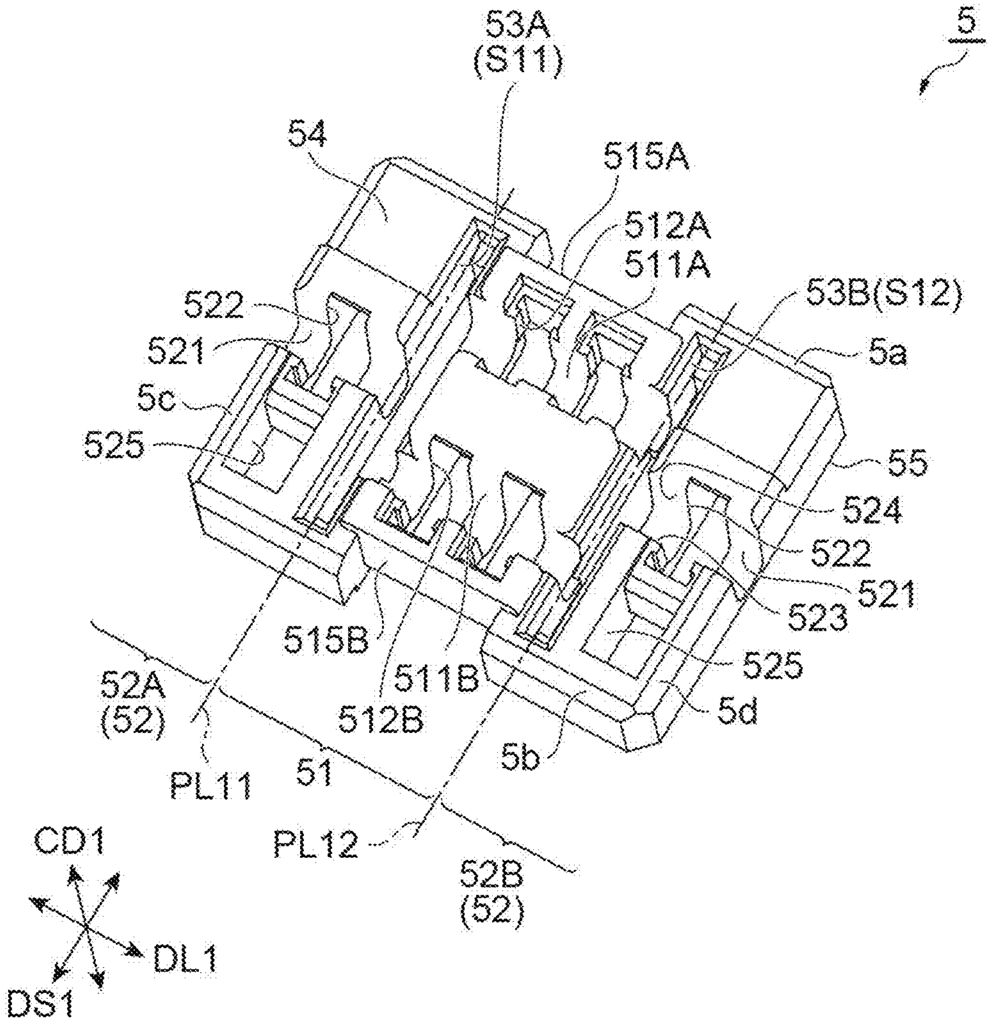
FIG. 5 is a perspective view of a contact holding portion of the receptacle connector.

As illustrated in FIG. 3 and FIG. 5, the contact holding portion 5 is an insulating member that holds the plurality of contacts 4. For example, the contact holding portion 5 is formed by injection molding of a resinous material. The contact holding portion 5 has a back surface 55 facing the circuit board 101 and a front surface 54 facing away from the back surface 55. The front surface 54 faces the plug connector 3. The contact holding portion 5 has an outer shape approximating a rectangle when viewed from the plug connector 3 (see FIG. 5). The rectangle has a pair of long sides 5*a* and 5*b* along the long side direction DL1 and a pair of short sides 5*c* and 5*d* along the short side direction DS1.

The contact holding portion 5 are partitioned into a plurality of holding areas in a direction perpendicular to the connection direction CD1. The plurality of holding areas includes a first type holding area 51 (first grouping area) and a second type holding area 52 (first individual area). The first type holding area 51 holds the plurality of contacts 4. For example, the first type holding area 51 holds the plurality of first type contacts 4A (for example, four first type contacts 4A). The second type holding area 52 holds one contact 4 and does not hold another contact 4. For example, the second type holding area 52 holds one second type contact 4B.

The plurality of holding areas may include two second type holding areas 52, and at least one first type holding area 51 may be interposed between the plurality of the second type holding area 52. As an example, the contact holding portion 5 is partitioned into one first type holding area 51 and two second type holding areas 52 sandwiching the first type holding area 51. The first type holding area 51 and the two second type holding areas 52 are disposed along the long side direction DL1. Hereinafter, the two second type holding areas 52 are distinguished as second type holding areas 52A and 52B (first individual area and an additional first individual area).

The plurality of holding areas may be partitioned by an air gap formed in the contact holding portion 5. For example, the second type holding area 52A and the first type holding area 51 are partitioned by an air gap S11 along a boundary PL11 perpendicular to the long side direction DL1. For example, the second type holding area 52A and the first type holding area 51 are partitioned by a slit 53A perpendicular to the long side direction DL1.

The first type holding area 51 and the second type holding area 52B are partitioned by an air gap S12 along a boundary PL12 perpendicular to the long side direction DL1. For example, the first type holding area 51 and the second type holding area 52B are partitioned by a slit 53B perpendicular to the long side direction DL1.

The air gap here may not be an air gap in a completed state of the receptacle connector 2, but means an air gap in a case where the contact holding portion 5 exists alone. That is, the air gap here includes a portion filled with another member different from the contact holding portion 5 in the completed state of the receptacle connector 2. For example, at least a part of the air gap S11 is filled with a partition wall 61A described later, and at least a part of the air gap S12 is filled with a partition wall 61B described later.

In the contact holding portion 5, all of the contacts 4 are disposed so that the linking direction of the connecting portion 41 and the contact portion 42 (the direction in which the connecting portion 41 and the contact portion 42 linked to each other are disposed) is along the same direction when viewed from the connection direction CD1 (when viewed from the plug connector 3). For example, all of the contacts 4 are disposed such that the contact directions of the contact portion 42 and the contact 7 of the plug connector 3 are along the same direction. For example, all of the contact 4 are disposed such that the connection direction between the connecting portion 41 and the contact portion 42 are along the short side direction DS1. When viewed from the plug connector 3, the connecting portion 41 of all the contact 4 are disposed inside the outer edge of the contact holding portion 5 (the edge portion having the largest dimension in the long side direction DL1 and the short side direction DS1). The contact direction refers to a direction perpendicular to both a portion of the contact 4 that contacts the contact 7 and a portion of the contact 7 that contacts the contact 4.

As illustrated in FIG. 5, both the first type holding area 51 and the second type holding area 52 have accommodating grooves along the same direction (e.g., the long side direction DL1). As illustrated in FIG. 2, in both the first type holding area 51 and the second type holding area 52, the contact portion 42 of all the contact 4 are disposed so as to be exposed to the accommodating groove. The accommodating groove accommodates a retaining ridge (described later) of the plug connector 3. The contact 4 of the accommodating groove is disposed such that the contact portion 42 is in contact with a contact portion 72 (described later) of the contact 7 of the retaining ridge accommodated in the accommodating groove.

As an example, the first type holding area 51 has two accommodating grooves 511A and 511B parallel to each other.

Accommodating grooves 511A and 511B are formed in the front surface 54 of the contact holding portion 5 along the long side direction DL1. In the front surface 54, the accommodating groove 511A is located closer to the long side 5*a*, and the accommodating groove 511B is located closer to the long side 5*b*.

As illustrated in FIG. 2, the four first type contacts 4A held in the first type holding area 51 include two first type contacts 4A disposed along the accommodating groove 511A and two first type contacts 4A disposed along the accommodating groove 511B. That is, the plurality of first type contacts 4A held in the first type holding area 51 include two or more first type contacts 4A disposed along the long side direction DL1 (arrangement direction perpendicular to boundaries PL11 and PL12).

As an example, the first type holding area 51 has two contact accommodating portions 512A disposed along the accommodating groove 511A, as illustrated in FIG. 5. The contact accommodating portions 512A are holes provided in the back surface 55 of the contact holding portion 5 and are open to the accommodating groove 511A. As illustrated in FIG. 4, the contact portion 42 of the first type contact 4A is fixed to each of the contact accommodating portions 512A by press fitting or the like so that the first portion 421 and the second portion 422 are exposed to the accommodating groove 511A. Thus, all the first type contacts 4A disposed along the accommodating groove 511A are disposed such that the linking direction between the connecting portion 41 and the contact portion 42 as viewed from the connection direction CD1 is along the short side direction DS1. The connecting portion 41 of each of the first type contacts 4A disposed along the accommodating groove 511A extends from the contact portion 42 toward the long side 5*a*.

As illustrated in FIG. 5, the first type holding area 51 further includes a recess 515A at the center of the side surface along the long side 5*a* (the center in the long side direction DL1). The recess 515A is formed from the front surface 54 to the back surface 55. In the first type contact 4A in the accommodating groove 511A, the connecting portion 41 extending from the contact portion 42 toward the long side 5*a* is exposed in the recess 515A when viewed from the plug connector 3, as illustrated in FIG. 4. Thus, the connection state (mounting state) of the connecting portion 41 to the circuit board 101 is visible.

As illustrated in FIG. 5, the first type holding area 51 has two contact accommodating portions 512B disposed along the accommodating groove 511B. The contact accommodating portions 512B are holes provided in the back surface 55 of the contact holding portion 5 and are open to the accommodating groove 511B. As illustrated in FIG. 4, the contact portion 42 of the first type contact 4A is fixed to each of the contact accommodating portions 512B by press fitting or the like so that the first portion 421 and the second portion 422 are exposed to the accommodating groove 511B. As a result, all the first type contact 4A disposed along the accommodating groove 511B are disposed such that the connection direction between the connecting portion 41 and the contact portion 42 as viewed from the connection direction CD1 is along the short side direction DS1. The connecting portion 41 of each of the first type contacts 4A disposed along the accommodating groove 511B extends from the contact portion 42 toward the long side 5$b$ as illustrated in FIG. 2. That is, the connecting portion 41 of the first type contact 4A of the accommodating groove 511A and the connecting portion 41 of the first type contact 4A of the accommodating groove 511B extend in opposite directions.

As illustrated in FIG. 5, the first type holding area 51 further includes a recess 515B at the center of the side surface along the long side 5$b$ (the center in the long side direction DL1). In the first type contact 4A in the accommodating groove 511B, the connecting portion 41 extending from the contact portion 42 toward the long side 5$b$ is exposed in the recess 515B when viewed from the plug connector 3, as illustrated in FIG. 4.

Each of the second type holding areas 52A and 52B has one accommodating groove 521 as illustrated in FIG. 5. The accommodating groove 521 is formed in the front surface 54 of the contact holding portion 5 along the long side direction DL1. In the front surface 54, the accommodating groove 521 is located between the long side 5$a$ and the long side 5$b$ (in the middle of the short side direction DS1).

The one second type contact 4B held in each of the second type holding areas 52A and 52B are disposed in the accommodating groove 521. As an example, each of the second type holding areas 52A and 52B has one contact accommodating portion 522. The contact accommodating portion 522 is a hole provided in the back surface 55 of the contact holding portion 5 and is open to the accommodating groove 521. The contact portion 42 of the second type contact 4B is fixed to the accommodating groove 521 by press fitting or the like so that the first portion 421 and the second portion 422 are exposed to the accommodating groove 521. Accordingly, the second type contact 4B disposed in the accommodating groove 521 is also disposed such that the linking direction between the connecting portion 41 and the contact portion 42 is along the short side direction DS1, similarly to the first type contact 4A. The connecting portion 41 of the second type contact 4B extends from the contact portion 42 toward the long side 5$b$.

Each of the second type holding areas 52A and 52B further has a through hole 525 between the accommodating groove 521 and the long side 5$b$, as illustrated in FIG. 5. The through hole 525 penetrates between the front surface 54 and the back surface 55. In the second type contact 4B in the accommodating groove 521, the connecting portion 41 extending from the contact portion 42 toward the long side 5$b$ is exposed in the through hole 525 as viewed from the plug connector 3. Thus, the connection state (mounting state) of the connecting portion 41 to the circuit board 101 is visible.

The second type contact 4B held in the second type holding area 552A is adjacent to the first type contact 4A in the first type holding area 51 via the boundary PL11. The second type contact 4B held in the second type holding area 52B is adjacent to the first type contact 4A in the first type holding area 51 via the boundary PL12. As described above, an interval G11 in the long side direction DL1 (the arrangement direction) of the contacts 4 adjacent to each other via the boundaries PL11 and PL12 is larger than an interval G12 of the contacts 4 adjacent to each other along the long side direction DL1 in the first type holding area 51 (see FIG. 6).

Figure 6:
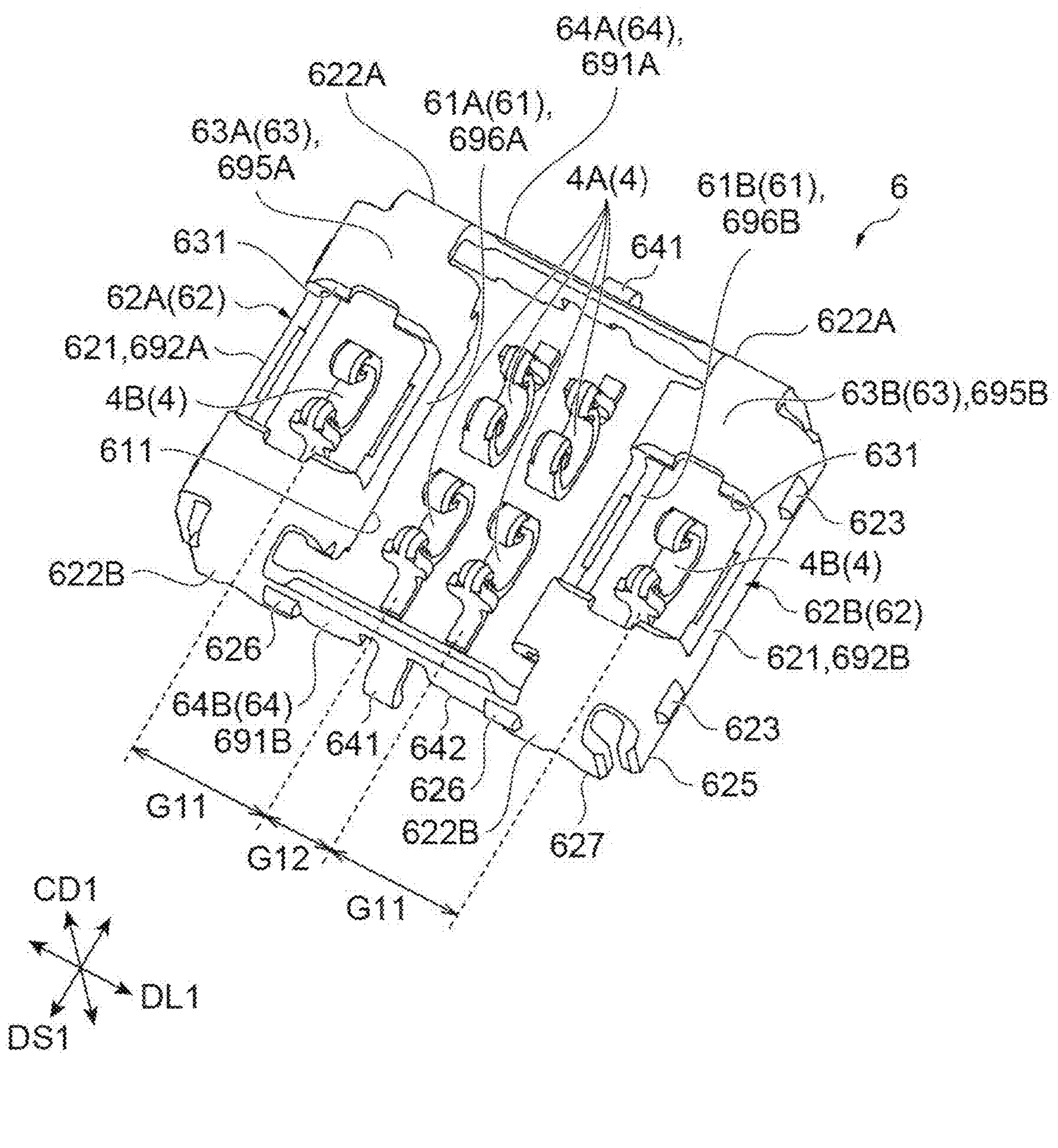
FIG. 6 is a perspective view illustrating an arrangement relationship between contacts and a shell of the receptacle connector.

The shell 6 is a conductive member attached to the contact holding portion 5. The shell 6 has at least one partition wall 61 that partitions the contact holding portion 5 into the plurality of holding areas, as illustrated in FIG. 6. The partition wall 61 is electrically connected to a ground conductor (not shown) of the circuit board 101. The partition wall 61 may be directly connected to the ground conductor of the circuit board 101, or may be connected to the ground conductor of the circuit board 101 via another portion of the shell 6. The shell 6 may include two partition walls 61 doubly interposed between the two second type holding areas 52A and 52B. At least one first type holding area 51 may intervene between the two partition walls 61.

As an example, the shell 6 has partition walls 61A and 61B as the two partition walls 61. The partition wall 61A is located in the air gap S11 to partition the second type holding area 52A and the first type holding area 51. The partition wall 61B is located in the air gap S12 to partition the first type holding area 51 and the second type holding area 52B. As illustrated in FIG. 3, each of the partition walls 61A and 61B has an end edge 611 (end portion) in contact with the circuit board 101, and is electrically connected to the ground conductor of the circuit board 101 in the end edge 611.

The shell 6 may further include a conductive surrounding wall 62 aligned with the partition wall 61 along the circumference of the second type holding area 52, as illustrated in FIG. 2 and FIG. 6. For example, the conductive surrounding wall 62 is disposed around the circumference of the second type holding area 52 so that the surrounding wall 62 and the partition wall 61 are at least partially surround the second type holding area 52. The shell 6 may have a surrounding wall 62 for each of the two second type holding areas 52A and 52B. For example, the shell 6 includes a conductive surrounding wall 62A aligned with the partition wall 61A along the outer periphery of the second type holding area 52A, and a conductive surrounding wall 62B aligned with the partition wall 61B along the outer periphery of the second type holding area 52B. For example, the conductive surrounding wall 62A is disposed around the circumference of the second type holding area 52A so that the surrounding wall 62A and the partition wall 61A are at least partially surround the second type holding area 52A. The conductive surrounding wall 62B is disposed around the circumference of the second type holding area 52B so that the surrounding wall 62B and the partition wall 61B are at least partially surround the second type holding area 52B. Each of surrounding walls 62A and 62B includes a facing portion 621 and side portions 622A and 622B (first wall portions).

The facing portion 621 faces the partition wall 61 across the second type holding area 52. For example, the facing portion 621 of the surrounding wall 62A covers at least a part of the side surface of the contact holding portion 5 along the short side 5$c$, and faces the partition wall 61A across the second type holding area 52A. The facing portion 621 of a surrounding wall 62B covers at least a part of the side surface of the contact holding portion 5 along the short side 5$d$, and faces the partition wall 61B across the second type holding area 52B. As illustrated in FIG. 3, the facing portion 621 has an end edge 625 (end portion) in contact with the circuit board 101, and is electrically connected to the ground conductor of the circuit board 101 in the end edge 625. The facing portion 621 has a protrusion protruding outward (in a direction opposite to the direction toward the second type holding area 52). For example, as illustrated in FIG. 6, the facing portion 621 has two protrusions 623 disposed along the short side direction DS1.

As illustrated in FIG. 6, the side portions 622A and 622B face each other across the second type holding area 52 in a direction perpendicular to the facing direction of the partition wall 61 and the facing portion 621. A side portion 622A covers at least a portion of the side surface of the second type holding area 52 along the long side 5$a$. A side portion 622B covers at least a portion of a side surface of the second type holding area 52 along the long side 5*b*. As illustrated in FIG. 3, each of the side portions 622A and 622B has an end edge 627 (end portion) in contact with the circuit board 101, and is electrically connected to the ground conductor of the circuit board 101 in the end edge 627. Each of the side portions 622A and 622B has a protrusion 626 protruding outward (in a direction opposite to the direction towards the second type holding area 52).

As illustrated in FIG. 2, the shell 6 may further include a conductive intra-area connecting plate 63 (intra-area connecting portion) that electrically connects the partition wall 61 and the surrounding wall 62 disposed along the outer periphery of the second type holding area 52 to each other. An intra-area connecting plate 63 may extend across the connection direction CD1. The intra-area connecting plate 63 may be disposed to face the plug connector 3.

The shell 6 may have the intra-area connecting plate 63 for each of the two second type holding areas 52A and 52B. For example, the shell 6 has two intra-area connecting plates 63A and 63B. The intra-area connecting plate 63A electrically connects the partition wall 61A and the surrounding wall 62A disposed along the outer periphery of the second type holding area 52A to each other. More particularly, the intra-area connecting plate 63A covers at least a portion of the front surface 54 and is connected to an end edge of the partition wall 61A, an end edge of the facing portion 621 of the surrounding wall 62A, and end edges of the side portions 622A and 622B of the surrounding wall 62A.

An intra-area connecting plate 63B electrically connects the partition wall 61B and the surrounding wall 62B disposed along the outer periphery of the second type holding area 52B to each other. More particularly, the intra-area connecting plate 63B covers at least a portion of the front surface 54 and is connected to an end edge of the partition wall 61B, an end edge of the facing portion 621 of the surrounding wall 62B, and end edges of the side portions 622A and 622B of the surrounding wall 62B. Each of the intra-area connecting plates 63A and 63B has an opening 631 for exposing the second type contact 4B disposed in the second type holding area 52.

As illustrated in FIG. 6, the shell 6 may further include an inter-area connecting plate 64 (first inter-area connecting portion) that electrically connects the partition wall 61A on the outer circumference of the second type holding area 52A and the partition wall 61B on the outer circumference of the second type holding area 52B. The inter-area connecting plate 64 may be along the periphery of the first type holding area 51. For example, the shell 6 includes inter-area connecting plates 64A and 64B.

The inter-area connecting plate 64A covers at least a portion of a side surface of the first type holding area 51 along the long side 5*a* and electrically connects the partition wall 61A and the partition wall 61B. Therefore, the above-mentioned two first type contacts 4A disposed along the accommodating groove 511A are disposed along the inter-area connecting plate 64A, and the connecting portion 41 of each of the two first type contacts 4A is disposed so as to protrude toward the inter-area connecting plate 64A. The inter-area connecting plate 64A is opposed to the connecting portion 41 of the two first type contacts 4A.

An inter-area connecting plate 64B covers at least a portion of a side surface of the first type holding area 51 along the long side 5*b* and electrically connects the partition wall 61A and the partition wall 61B. Therefore, the above-mentioned the two first type contacts 4A disposed along the accommodating groove 511B are disposed along the inter-area connecting plate 64B, and the connecting portion 41 of each of the two first contact 4A is disposed so as to protrude toward the inter-area connecting plate 64B. The inter-area connecting plate 64B is opposed to the connecting portion 41 of the two first type contacts 4A.

In the connection direction CD1, as illustrated in FIG. 6, the inter-area connecting plates 64A and 64B include an end edge 642 facing the circuit board 101 and a ground connecting portion 641 protruding downward from the end edge 642 and contacting the circuit board 101. The inter-area connecting plates 64A and 64B are electrically connected to the ground conductor of the circuit board 101 in the ground connecting portion 641. The ground connecting portion 641 is located in the middle of the partition walls 61A and 61B (middle in the long side direction DL1). The ground connecting portion 641 bulges outward (in a direction opposite to the direction toward the first type holding area 51) to avoid contact with the connecting portion 41 of the first type contact 4A.

The shell 6 includes the inter-area connecting plates 64A and 64B, so that the first type holding area 51 is surrounded by the partition walls 61A and 61B and the inter-area connecting plates 64A and 64B. The entirety of the contact holding portion 5 is surrounded by the surrounding walls 62A and 62B and the inter-area connecting plates 64A and 64B.

The shell 6 is formed, for example, by punching one sheet of plate material from a metallic thin plate material and bending the punched plate material. The plate has outer wall portions 691A, 691B, 692A, and 692B, ceiling plate portions 695A and 695B, and inner wall portions 696A and 696B (see FIG. 6).

The outer wall portion 691A is a plate-shaped part constituting the side portion 622A of the surrounding wall 62A, the side portion 622A of the surrounding wall 62B, and the inter-area connecting plate 64A. An outer wall portion 691B is a plate-shaped part constituting the side portion 622B of the surrounding wall 62A, the side portion 622B of the surrounding wall 62B, and the inter-area connecting plate 64B. An outer wall portion 692A is a plate-shaped part constituting the facing portion 621 of the surrounding wall 62A. An outer wall portion 692B is a plate-shaped part constituting the facing portion 621 of the surrounding wall 62B. A ceiling plate portion 695A is a plate-shaped part constituting the intra-area connecting plate 63A. A ceiling plate portion 695B is a plate-shaped part constituting the intra-area connecting plate 63B. An inner wall portion 696A is a plate-shaped part constituting the partition wall 61A. An inner wall portion 696B is a plate-shaped part constituting the partition wall 61B.

The shell 6 is formed by folding the outer wall portions 691A, 691B, 692A, and 692B, and the inner wall portions 696A and 696B by about 90 degrees in the same direction with respect to the ceiling plate portions 695A and 695B. The formed shell 6 is attached to the contact holding portion 5, for example, by press fitting.

Figure 7:
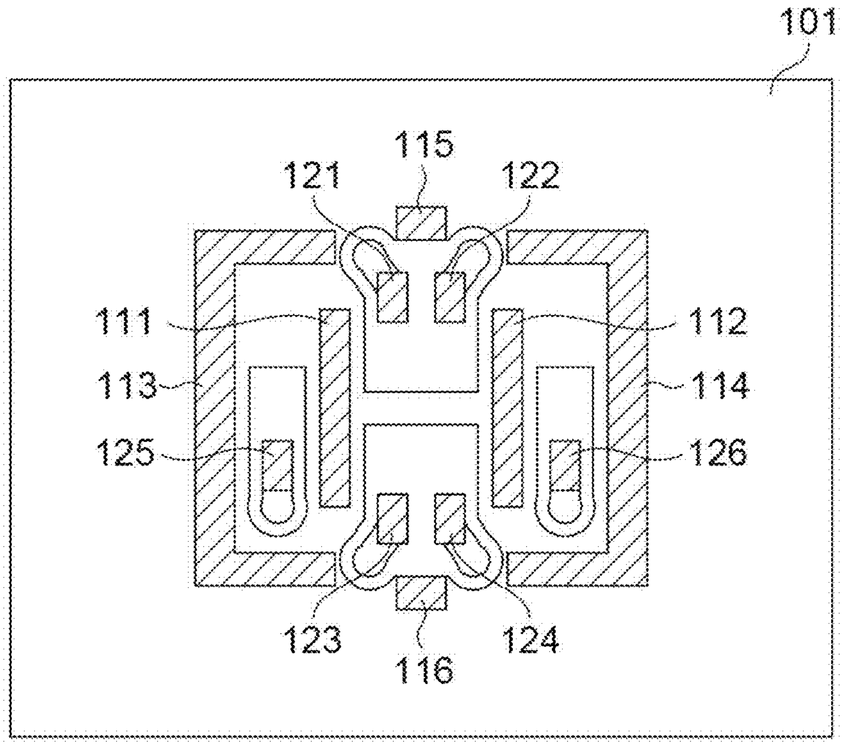
FIG. 7 is a plan view illustrating an arrangement of a conductor exposed portion of a circuit board to which the receptacle connector is attached.

The receptacle connector 2 configured as described above is attached to the circuit board 101 with the back surface 55 facing the circuit board 101. As illustrated in FIG. 7, the circuit board 101 includes ground conductor exposing portions 111, 112, 113, 114, 115, and 116 and signal conductor exposing portions 121, 122, 123, 124, 125, and 126. The ground conductor exposing portions 111, 112, 113, 114, 115, and 116 are portions where the ground conductor of the circuit board 101 is exposed. To the ground conductor exposing portions 111, 112, 113, 114, 115, and 116, the end edge 611 of the partition wall 61A, the end edge 611 of the partition wall 61B, the end edges 625, 627, and 627 of the surrounding wall 62A, the end edges 625, 627, and 627 of the surrounding wall 62B, the ground connecting portion 641 of the inter-area connecting plate 64A, and the ground connecting portion 641 of the inter-area connecting plate 64B are connected by soldering or the like, respectively.

The signal conductor exposing portions 121, 122, 123, 124, 125, and 126 are portions where six signal conductors of the circuit board 101 are exposed. The connecting portion 41 of the four first type contacts 4A and the connecting portion 41 of the two second type contacts 4B are connected to the signal conductor exposing portions 121, 122, 123, 124, 125, and 126 by soldering or the like, respectively.

The above-described configuration is merely an example, and can be modified. For example, the contact holding portion 5 may have at least one the second type holding area 52, and may not have two or more second type holding areas 52. The contact holding portion 5 may be partitioned into four or more holding areas. The first type holding area 51 may not be interposed between the two second type holding areas 52, and the second type holding area 52 may be adjacent to each other. Even in such a case, the two partition walls 61A and 61B may be doubly interposed between the second type holding areas 52.

Plug Connector

Figure 8:
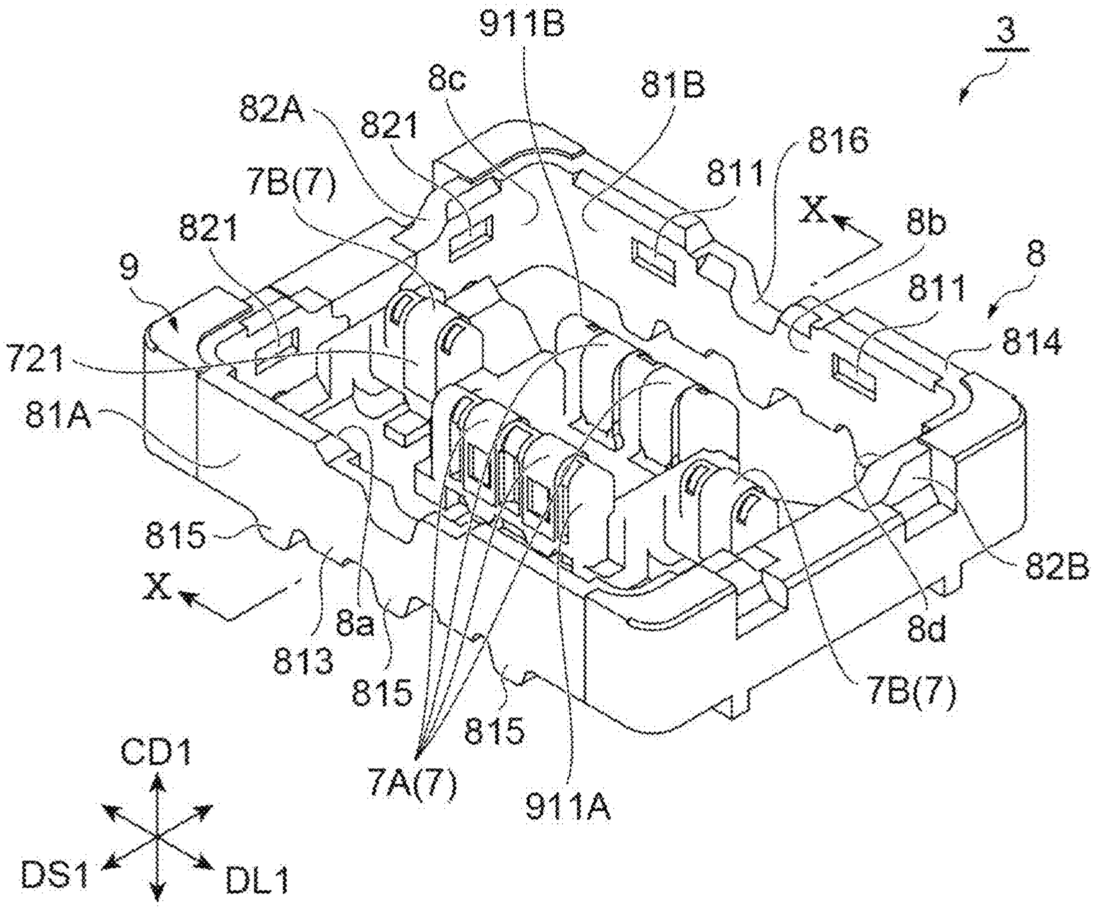
FIG. 8 is a perspective view illustrating an example of a plug connector.
Figure 9:
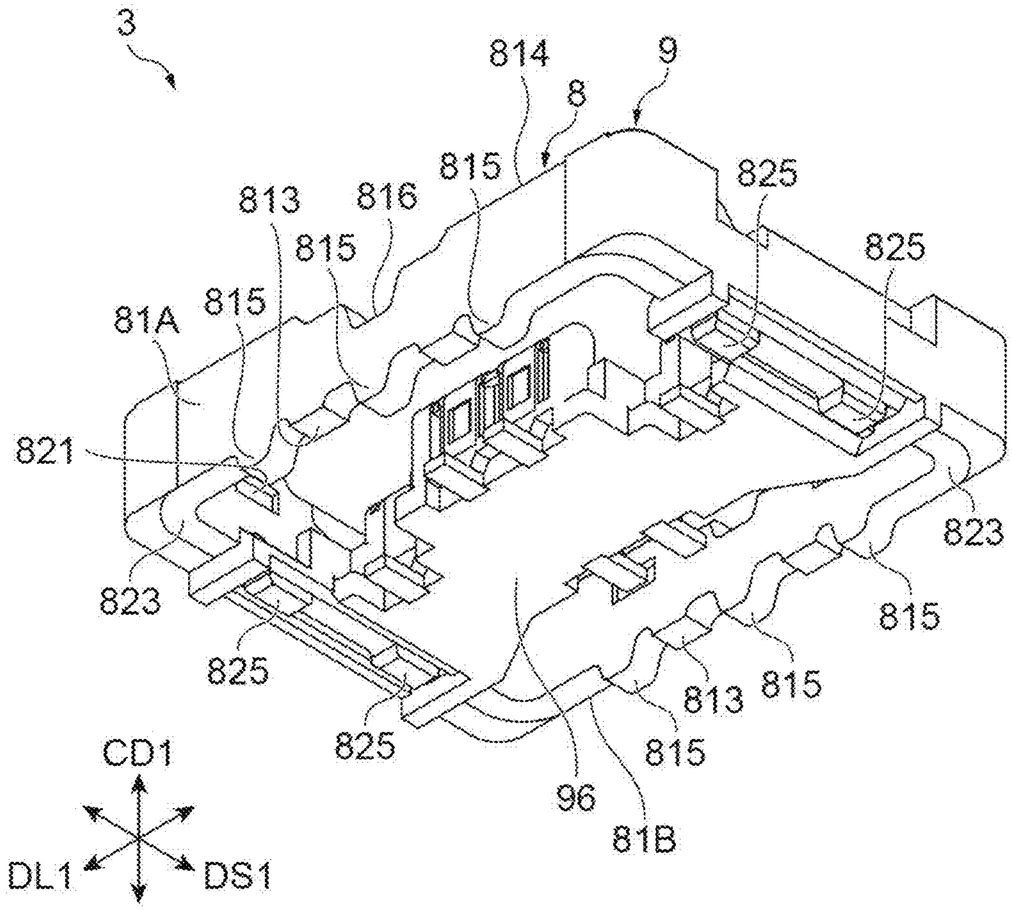
FIG. 9 is a perspective view of the plug connector from another direction.
Figure 10:
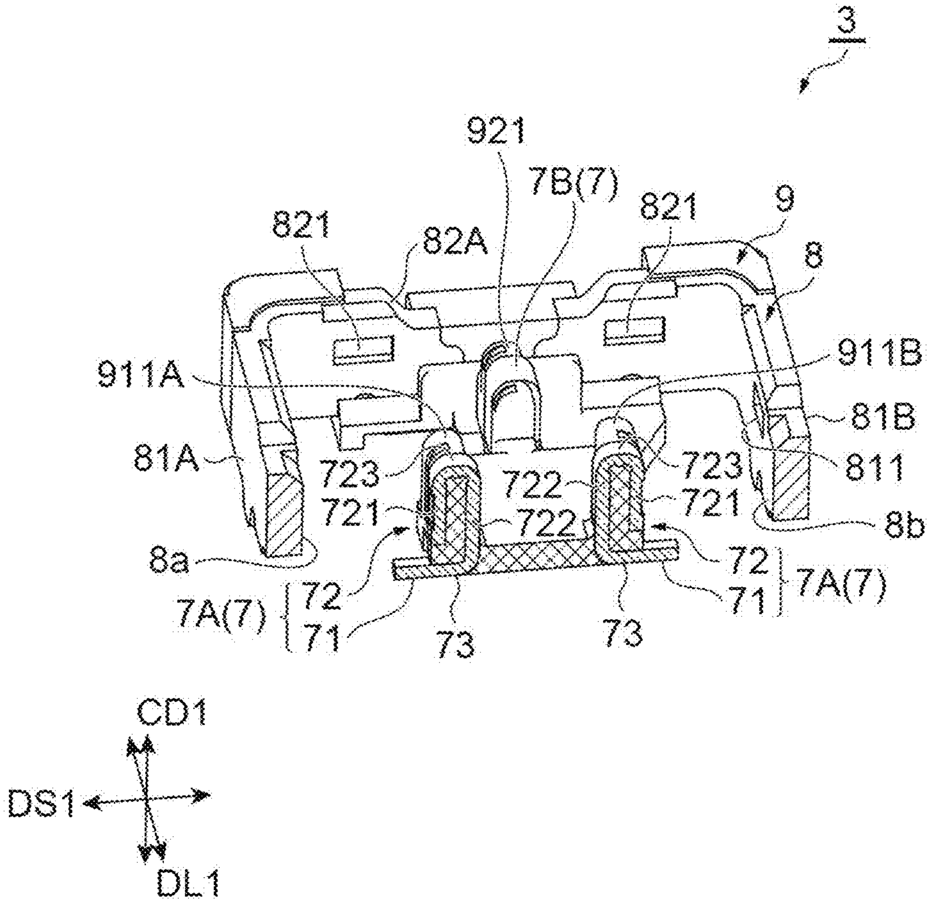
FIG. 10 is a perspective view of the plug connector illustrating a cross section taken along line X-X in FIG. 8.

Next, the configuration of the plug connector 3 will be described in detail. As described above, the plug connector 3 is attached to the circuit board 102 and connected to the receptacle connector 2, which is a mating connector. As illustrated in FIG. 8 to FIG. 10, the plug connector 3 include the plurality of contacts 7, a shell 8, and a contact holding portion 9.

The plurality of contacts 7 are electrically connected to the plurality of conductors of the circuit board 102, respectively, and contact the plurality of contacts 4 of the receptacle connector 2, respectively. The plurality of contacts 7 may include the contact 7 of different types. For example, the plurality of contacts 7 include a plurality of first type contacts 7A and at least one second type contact 7B of a type different from a first type contact 7A. As an example, the plug connector 3 include six contacts 7, and the six contacts 7 include four first type contacts 7A and two second type contacts 7B. As an example, the second type contact 7B is a contact that transmits higher frequency signals compared to signals transmitted by the first type contact 7A.

As illustrated in FIG. 10, each of the six contacts 7 has a connecting portion 71, the contact portion 72, and a linking portion 73. The connecting portion 71 is connected to a conductor (for example, a signal conductor) of the circuit board 102. The contact portion 72 contacts the contact 4 of the receptacle connector 2. The connecting portion 71 and the contact portion 72 are linked to each other.

The contact portion 72 includes a first portion 721, a second portion 722, and a linking portion 723. The first portion 721 and the second portion 722 protrude toward the receptacle connector 2 along the connection direction CD1, and are sandwiched between the first portion 421 and the second portion 422 of the contact 4. Between the first portion 421 and the second portion 422, for example, the first portion 721 contacts the first portion 421, and the second portion 722 contacts the second portion 422. The first portion 721 may contact the second portion 422 and the second portion 722 may contact the first portion 421. The linking portion 723 links the tip of the first portion 721 and the tip of the second portion 722.

The linking portion 73 links the base of the second portion 722 and the connecting portion 71. The linking portion 73 extends from the base of the second portion 722 toward the first portion 721 along a plane perpendicular to the connection direction CD1 and is connected to the connecting portion 71. The connecting portion 71 extends outwardly from the outer surface of the first portion 721 (the surface facing away from the second portion 722) along an extension of the linking portion 73. The contact 7 is formed by punching one sheet of plate material from a metallic thin plate and bending the punched plate material. The connecting portion 71 may have any shape as long as it can be attached to the circuit board 102, and may have a shape that does not protrude outward.

The shell 8 is a conductive member surrounding the plurality of contacts 7. The shell 8 surrounds a region having an outer shape approximating a rectangle when viewed from the receptacle connector 2 (see FIG. 11). The rectangle has a pair of long sides 8*a* and 8*b* along the long side direction DL1 and a pair of short sides 8*c* and 8*d* along the short side direction DS1. The shell 8 has a sidewall 81A (inter-area connecting portion) along a long side 8*a*, a sidewall 81B (inter-area connecting portion) along a long side 8*b*, a sidewall 82A along a short side 8*c*, and a sidewall 82B along a short side 8*d*.

Figure 13:
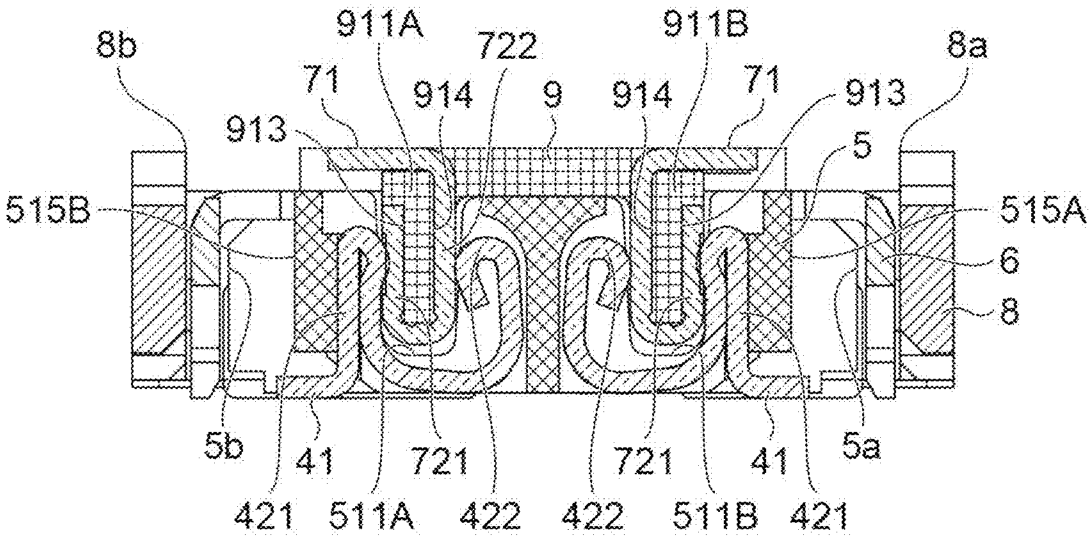
FIG. 13 is a cross-sectional view illustrating a fitted state of the receptacle connector and the plug connector in a first type holding area.

As illustrated in FIG. 13, in a state where the plug connector 3 is fitted to the receptacle connector 2, the shell 8 is located at the outer periphery of the shell 6. In this state, the sidewall 81A contacts the side portion 622A of the surrounding wall 62A, the side portion 622A of the surrounding wall 62B, and the inter-area connecting plate 64A. The sidewall 81B contacts the side portion 622B of the surrounding wall 62A, the side portion 622B of the surrounding wall 62B, and the inter-area connecting plate 64B. The sidewall 82A contacts the facing portion 621 of the surrounding wall 62A. The sidewall 82B contacts the facing portion 621 of the surrounding wall 62B.

The sidewall 81A has two recesses 811 on the inner surface (the surface facing the sidewall 81B). Similarly, the sidewall 81B has two recesses 811 on the inner surface (the surface facing the sidewall 81A). The two recesses 811 engage the protrusion 626 of the surrounding walls 62A and the surrounding wall 62B, respectively.

In the connection direction CD1, each of the sidewalls 81A and 81B has an end edge 813 facing the circuit board 102 and at least one ground connecting portion 815 protruding from the end edge 813 and contacting the circuit board 102, as illustrated in FIG. 9. For example, each of the sidewalls 81A and 81B has three ground connecting portions 815 disposed along the long side direction DL1. Each of the sidewalls 81A and 81B is electrically connected to the ground conductor of the circuit board 102 at the ground connecting portion 815.

Each of the sidewalls 81A and 81B further includes an end edge 814 not facing the circuit board 102 and a relief portion 816 provided in the end edge 814. The relief portion 816 of the sidewalls 81A and 81B each accept the ground connecting portion 641 of the inter area connecting plates 64A and 64B.

As illustrated in FIG. 10, the sidewall 82A has two recesses 821 on an inner surface (a surface facing the sidewall 82B). The two recesses 821 are respectively engaged with the two protrusion 623 of the surrounding wall 62A. Similarly, the sidewall 82B has the two recesses 821 on an inner surface (a surface facing the sidewall 82A). The two recesses 821 are respectively engaged with the two protrusion 623 of the surrounding wall 62B.

In the connection direction CD1, each of sidewalls 82A and 82B has an end edge 823 facing the circuit board 102 and at least one ground connecting portion 825 protruding from the end edge 823 and contacting the circuit board 102, as illustrated in FIG. 9. For example, each of the sidewalls 82A and 82B has two ground connecting portions 825 disposed along the short side direction DS1. Each of the sidewalls 82A and 82B is electrically connected to the ground conductor of the circuit board 102 in the ground connecting portion 825.

Figure 11:
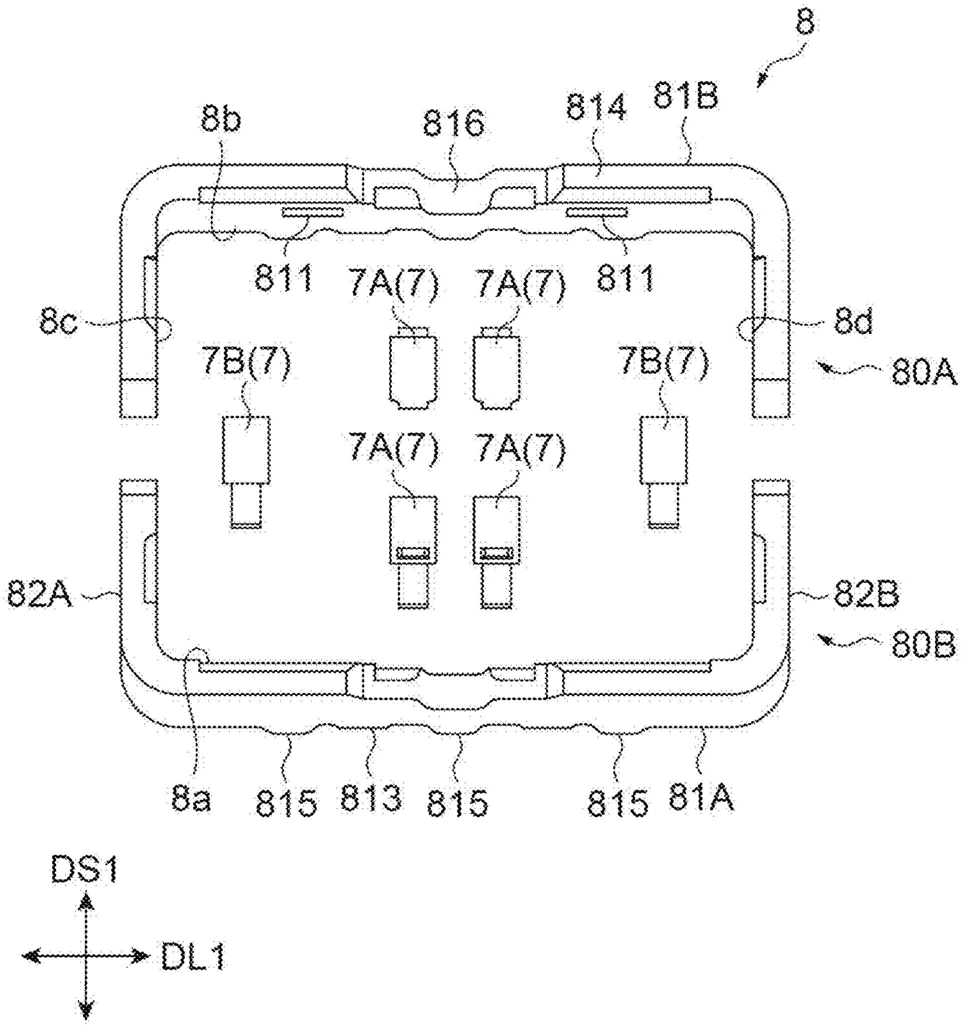
FIG. 11 is a perspective view illustrating an arrangement relationship between contacts and shells of the plug connector.

As illustrated in FIG. 11, the shell 8 is divided into two shell members 80A and 80B (second wall portions) disposed in the short side direction DS1 at the middle of the sidewall 82A in the short side direction DS1 (for example, between the two ground connecting portions 825) and at the middle of the sidewall 82B in the short side direction DS1 (for example, between the two ground connecting portions 825). A shell member 80A includes the sidewall 81A, and a shell member 80B includes the sidewall 81B.

Each of the shell members 80A and 80B is formed, for example, by punching one sheet of plate material from a metallic thin plate material and bending the punched plate material. In this manner, the shell 8 is divided into two members, thereby facilitating processing.

The thickness (plate thickness) of the metallic thin plate material used in the shell 8 of the plug connector 3 may be larger than the thickness (plate thickness) of the metallic thin plate material used in the shell 6 of the receptacle connector 2. When the receptacle connector 2 and the plug connector 3 are fitted, the shell 8 of the plug connector 3 is disposed outside the shell 6 of the receptacle connector 2. By increasing the plate thickness of the shell 8 disposed outside, the rigidity of the connector device 1 in the fitted state can be increased.

As illustrated in FIG. 8, the contact holding portion 9 is an insulating member that holds the plurality of contacts 7 and the shell 8. For example, the contact holding portion 9 is formed by insert molding in a state where the plurality of contacts 7 and the shell 8 are disposed.

Figure 12:
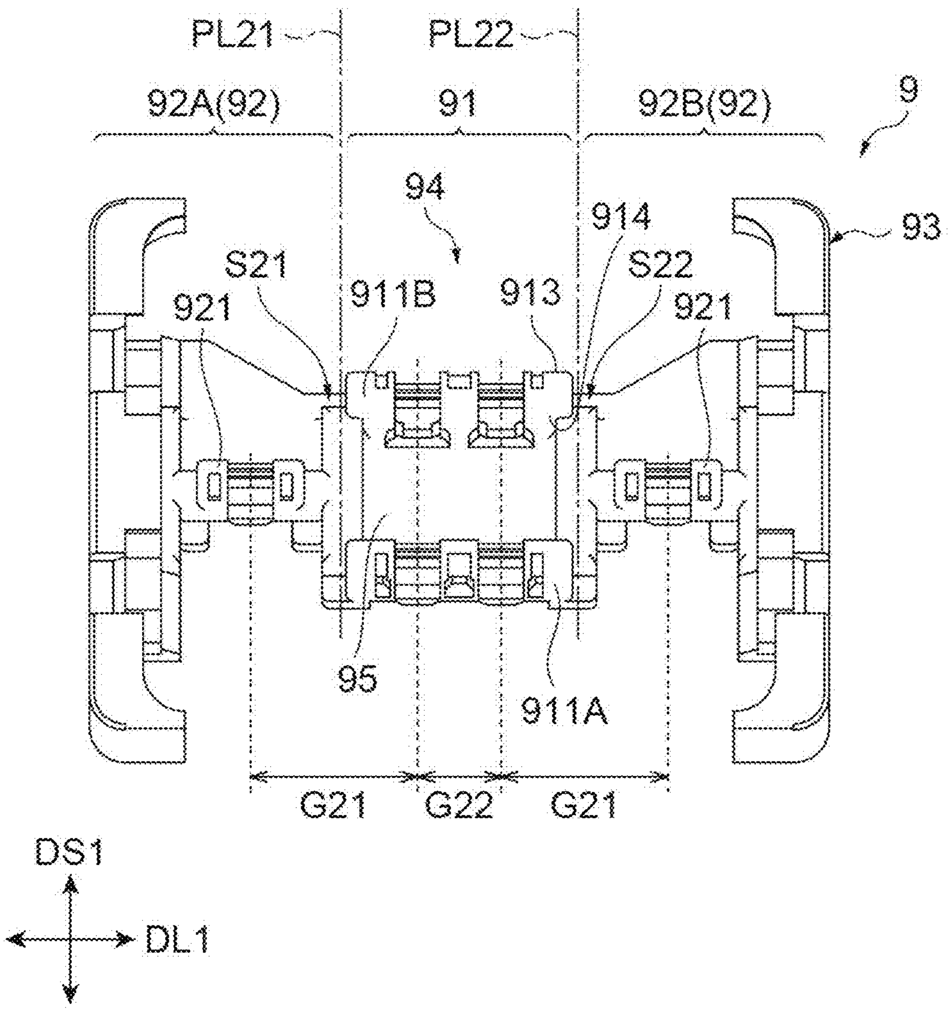
FIG. 12 is a perspective view of a contact holding portion of the plug connector.

As illustrated in FIG. 12, the contact holding portion 9 includes a frame portion 93 and a main body 94. The frame portion 93 holds at least a part (for example, the sidewalls 82A and 82B) of the shell 8 from the outer periphery. The main body 94 is located between the sidewalls 82A and 82B and is linked to the frame portion 93. The main body 94 has a back surface 96 facing the circuit board 102 and a front surface 95 facing away from the back surface 96, as illustrated in FIG. 9 and FIG. 12. The front surface 95 faces the receptacle connector 2. The main body 94 is partitioned into a plurality of holding areas in a direction perpendicular to the connection direction CD1.

The plurality of holding areas includes a first type holding area 91 (second grouping area) and a second type holding area 92 (second individual area). The first type holding area 91 holds the plurality of contacts 7. For example, the first type holding area 91 holds the plurality of first type contacts 7A (for example, the four first type contacts 7A). The second type holding area 92 holds one contact 7 and does not hold another contact 7. For example, the second type holding area 92 holds one second type contact 7B. The first type holding area 91 and the second type holding area 92 are not partitioned by a conductive member when the plug connector 3 is apart from the receptacle connector 2.

The plurality of holding areas may include two second type holding areas 92, and at least one first type holding area 91 may be interposed between the plurality of the second type holding area 92. As an example, the main body 94 is partitioned into one first type holding area 91 and two second type holding areas 92 sandwiching the first type holding area 91. The first type holding area 91 and the two second type holding areas 92 are disposed along the long side direction DL1. Hereinafter, the two second type holding areas 92 are distinguished as second type holding areas 92A and 92B.

The plurality of holding areas may be partitioned by an air gap formed in the main body 94. For example, a second type holding area 92A and the first type holding area 91 are partitioned by an air gap S21 along a boundary PL21 perpendicular to the long side direction DL1. The first type holding area 91 and a second type holding area 92B are partitioned by an air gap S22 along a boundary PL22 perpendicular to the long side direction DL1.

The air gap here may not pass through the main body 94 along the connection direction CD1, and at least a part of the connection direction CD1 may be the air gap. For example, the air gap S21 is formed between a retaining ridge 921 (described later) of the second type holding area 92A and retaining ridges 911A and 911B (described later) of the first type holding area 91. The air gap S22 is formed between the retaining ridges 911A, 911B (described later) of the first type holding area 91 and the retaining ridge 921 (described later) of the second type holding area 92B.

In the contact holding portion 9, as illustrated in FIG. 10, all the contacts 7 are disposed so that the linking direction of the connecting portion 71 and the contact portion 72 (the direction in which the connecting portion 71 and the contact portion 72 linked to each other are disposed) is along the same direction when viewed from the connection direction CD1 (when viewed from the receptacle connector 2). For example, each of the contacts 7 is disposed such that the contact directions of the contact portion 72 and the contact 4 of the receptacle connector 2 are along the same direction. For example, all of the contact portion 72 are disposed so that the linking direction between the connecting portion 71 and the contact portion 72 is along the short side direction DS1. When viewed from the receptacle connector 2, the connecting portion 71 of all the contact 7 are disposed inside the outer edge of the contact holding portion 9 (the edge portion having the largest dimension in the long side direction DL1 and the short side direction DS1).

Both the first type holding area 91 and the second type holding area 92 have a retaining ridge protruding from the base towards the receptacle connector 2 along the same direction (e.g. the long side direction DL1). In both the first type holding area 91 and the second type holding area 92, the contact portions 72 of all the contacts 7 are exposed to the side of the retaining ridge.

As an example, the first type holding area 91 has two retaining ridges 911A and 911B parallel to each other, as illustrated in FIG. 8 and FIG. 12. The retaining ridges 911A and 911B are formed in the front surface 95 of the main body 94 and protrude from the base along the long side direction DL1 towards the receptacle connector 2. In the front surface 95, the retaining ridge 911A is located closer to the long side 8*a* than the shell 8, and the retaining ridge 911B is located closer to the long side 8*b* of the shell 8.

The four first type contacts 7A held in the first type holding area 91 include two first type contacts 7A disposed along the retaining ridge 911A and two first type contacts 7A disposed along the retaining ridge 911B. That is, the plurality of first type contacts 7A held in the first type holding area 91 include two or more first type contacts 7A disposed along the long side direction DL1 (arrangement direction perpendicular to boundaries PL21 and PL22).

All the first type contacts 7A disposed along the retaining ridge 911A are attached to the retaining ridge 911A such that the first portion 721 and the second portion 722 are exposed to the side of the retaining ridge 911A, as illustrated in FIG. 10. Thus, all the first type contacts 7A disposed along the retaining ridge 911A are disposed such that the linking direction between the connecting portion 71 and the contact portion 72 is along the short side direction DS1 when viewed from the connection direction CD1. The second portion 722 penetrates the first type holding area 91 from the front surface 95 to the back surface 96, and the linking portion 73 is exposed to the back surface 96. The connecting portion 71 extends from the linking portion 73 toward the long side 8*a*. In the first type contact 7A of the retaining ridge 911A, the connecting portion 71 extending from the linking portion 73 toward the long side 8*a* is exposed between the main body 94 and the long side 8*a* as viewed from the receptacle connector 2. This enables visual confirmation of the connection state of the connecting portion 71 to the circuit board 102.

All the first type contacts 7A disposed along the retaining ridge 911B are attached to the retaining ridge 911B such that the first portion 721 and the second portion 722 are exposed to the side of the retaining ridge 911B, as illustrated in FIG. 10. Thus, all the first type contacts 7A disposed along the retaining ridge 911B are disposed such that the linking direction between the connecting portion 71 and the contact portion 72 is along the short side direction DS1 when viewed from the connection direction CD1. The second portion 722 penetrates the first type holding area 91 from the front surface 95 to the back surface 96, and the linking portion 73 is exposed to the back surface 96. The connecting portion 71 extends from the linking portion 73 toward the long side 8*b*. In the first type contact 7A of the retaining ridge 911B, the connecting portion 71 extending from the linking portion 73 toward the long side 8*b* is exposed between the main body 94 and the long side 8*b* as viewed from the receptacle connector 2. This enables visual confirmation of the connection state of the connecting portion 71 to the circuit board 102.

With the plug connector 3 fitted to the receptacle connector 2, the retaining ridge 911A is housed in the accommodating groove 511A and the retaining ridge 911B is housed in the accommodating groove 511B (see FIG. 13). In any of the retaining ridges 911A and 911B, the first portion 721 of the first type contact 7A contacts the first portion 421 of the first type contact 4A, and the second portion 722 of the first type contact 7A contacts the second portion 422 of the first type contact 4A.

Each of the second type holding areas 92A and 92B has one retaining ridge 921. The retaining ridge 921 is formed in the front surface 95 of the main body 94 and protrudes from the base along the long side direction DL1 toward the receptacle connector 2. In the short side direction DS1, the retaining ridge 921 is located between the long side 8*a* and the long side 8*b*.

As illustrated in FIG. 12, the retaining ridge 921 of the second type holding area 92A is partitioned from the retaining ridges 911A and 911B of the first type holding area 91 by the air gap S21 along the boundary PL21. The retaining ridge 921 of the second type holding area 92B are partitioned from the retaining ridges 911A and 911B of the first type holding area 91 by the air gap S22 along the boundary PL22. The one second type contact 7B held in each of the second type holding areas 92A and 92B are disposed in the retaining ridge 921.

The second type contact 7B disposed in the retaining ridge 921 is attached to the retaining ridge 921 so that the first portion 721 and the second portion 722 are exposed to the side surface of the retaining ridge 921, similarly to the first type contact 7A disposed in the retaining ridge 911B illustrated in FIG. 10. Accordingly, the second type contact 7B disposed in the retaining ridge 921 is also disposed such that the linking direction between the connecting portion 71 and the contact portion 72 is along the short side direction DS1. The second portion 722 penetrates the second type holding area 92 from the front surface 95 to the back surface 96, and the linking portion 73 is exposed to the back surface 96. The connecting portion 71 extends from the linking portion 73 toward the long side 8*a*. In the second type contact 7B of the retaining ridge 921, the connecting portion 71 extending from the linking portion 73 toward the long side 8*a* is exposed between the main body 94 and the long side 8*a* as viewed from the receptacle connector 2. This enables visual confirmation of the connection state of the connecting portion 71 to the circuit board 102.

The second type contact 7B held in the second type holding area 92A is adjacent to the first type contact 7A of the first type holding area 91 via the boundary PL21. The second type contact 7B held in the second type holding area 92B is adjacent to the first type contact 7A of the first type holding area 91 via the boundary PL22. As described above, an interval G21 in the long side direction DL1 (the arrangement direction) of the contacts 7 adjacent to each other via the boundaries PL21 and PL22 is larger than an interval G22 of the contacts 7 adjacent to each other along the long side direction DL1 in the first type holding area 91 (see FIG. 12).

Figure 14:
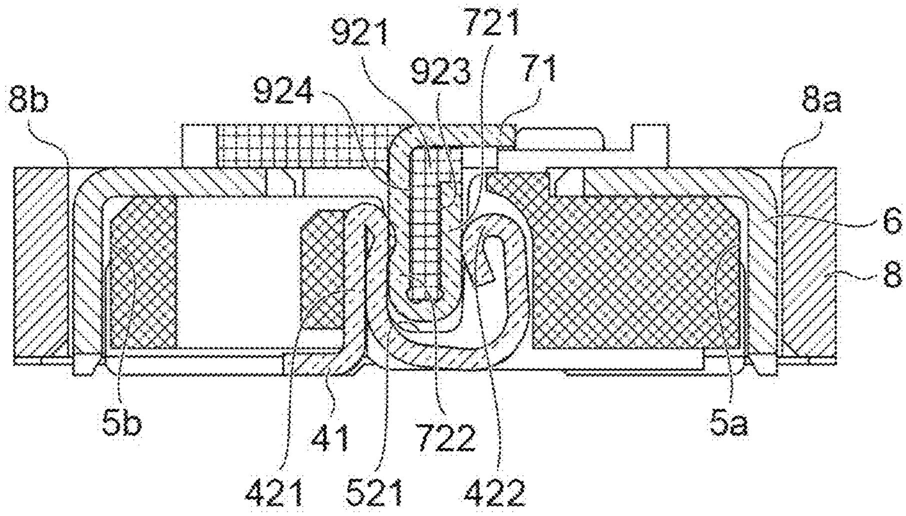
FIG. 14 is a cross-sectional view illustrating a fitted state of the receptacle connector and the plug connector in a second type holding area.

With the plug connector 3 fitted to the receptacle connector 2, the retaining ridge 921 is housed in the accommodating groove 521 (see FIG. 14). In the retaining ridge 921, the first portion 721 of the second type contact 7B contacts the second portion 422 of the second type contact 4B, and the second portion 722 of the second type contact 7B contacts the first portion 421 of the second type contact 4B.

Figure 15:
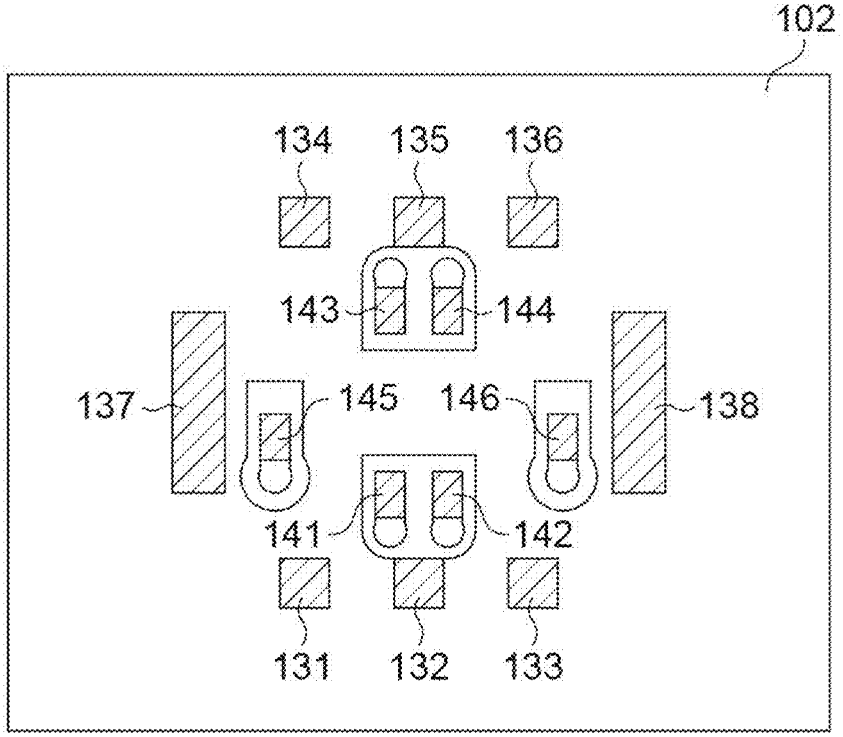
FIG. 15 is a plan view illustrating an arrangement of a conductor exposed portion of a circuit board to which the plug connector is attached.

The plug connector 3 configured as described above is attached to the circuit board 102 with the back surface 96 facing the circuit board 102. As illustrated in FIG. 15, the circuit board 102 includes ground conductor exposing portions 131, 132, 133, 134, 135, 136, 137, and 138 and signal conductor exposing portions 141, 142, 143, 144, 145, and 146.

The ground conductor exposing portions 131, 132, 133, 134, 135, 136, 137, and 138 are portions where the ground conductor of the circuit board 102 is exposed. To a ground conductor exposing portion 131, 132, 133, 134, 135, and 136, the three ground connecting portions 815 of the sidewall 81A and the three ground connecting portions 815 of the sidewall 81B are connected by soldering or the like. Two ground connecting portions 825 of the sidewall 82A are connected to a ground conductor exposing portion 137 by soldering or the like. Two ground connecting portions 825 of the sidewall 82B are connected to a ground conductor exposing portion 138 by soldering or the like.

The signal conductor exposing portions 141, 142, 143, 144, 145, and 146 are portions where six signal conductors of the circuit board 102 are exposed. The connecting portion 71 of the four first type contacts 7A and the connecting portion 71 of the two second type contacts 7B are connected to the signal conductor exposing portions 141, 142, 143, 144, 145, and 146 by soldering or the like, respectively.

The above-described configuration is merely an example, and can be modified. For example, the contact holding portion 9 may have at least one second type holding area 92, and may not have two or more second type holding areas 92. The contact holding portion 9 may be partitioned into four or more holding areas. The first type holding area 91 may not be interposed between the two second type holding areas 92, and the second type holding area 92 may be adjacent to each other.

SUMMARY

As described above, the connector device 1 includes the receptacle connector 2 as a first connector and the plug connector 3 as a second connector. At this time, the receptacle connector 2 includes: a plurality of conductive contacts 4 (first contact) respectively connected to a plurality of conductors of the circuit board 101 (first board), an insulating contact holding portion 5 (first contact holding portion) holding the plurality of contacts 4, the partitioning walls 61A and 61B functioning as a conductive first partition wall partitioning the first contact holding portion 5 into the first type holding area 51 that holds the plurality of contacts 4 (the first type contact 4A) and the second type holding area 52 that holds the one contact 4 (the second type contact 4B) and does not hold another the contact 4, and the surrounding walls 62A and 62B functioning as a conductive first surrounding wall electrically connected to the ground conductor of the circuit board 101 and aligned with the partitioning walls 61A and 61B along the outer periphery of the second type holding area 52. The plug connector 3 includes: the plurality of conductive contacts 7 (the second contact) which are respectively connected to the plurality of conductors of the circuit board 102 (the second board) and respectively contact the plurality of contacts 4 when the receptacle connector 2 and the plug connector 3 are fitted to each other, and the sidewalls 81A, 81B, 82A, 82B functioning as a conductive second surrounding wall electrically connected to the ground conductor of the circuit board 102.

When the receptacle connector 2 and the plug connector 3 are fitted, a single first partition wall is singly disposed between the first type holding area 51 and the second type holding area 52. For example, the partition wall 61A is singly disposed between the first type holding area 51 and the second type holding area 52A, and no other partition wall or the like is provided. The single the partition wall 61B is disposed between the first type holding area 51 and the second type holding area 52B, and no other partition wall or the like is provided. Further, a first surrounding wall and the second surrounding wall are doubly disposed on the outer periphery of the sidewall unit. For example the second surrounding wall is disposed inside or outside the first surrounding wall around the outer periphery of the side wall unit. For example, the sidewalls 81A, 81B, 82A, and the surrounding wall 62A are doubly disposed around the outer circumference of the second type holding area 52A, and the sidewalls 81A, 81B, 82B, and the surrounding wall 62B are doubly disposed around the outer circumference of the second type holding area 52B. For example, the sidewalls 81A, 81B, 82A is disposed outside the surrounding wall 62A around the outer circumference of the second type holding area 52A.

In the connector device 1, when the receptacle connector 2 (the first connector) and the plug connector 3 (the second connector) are fitted to each other, the first surrounding wall and the second surrounding wall are doubly disposed on the outer periphery of the second type holding area 52. Therefore, noise at the contact disposed in the second type holding area 52 that is likely to be noise sources, may be suppressed. On the other hand, a first partition wall is disposed between the first type holding area 51 and the second type holding area 52. Therefore, noise from the contacts held in the second type holding area 52 to the contacts held in the first type holding area 51 is suppressed while preventing an increase in size of as an apparatus.

Two the partition walls 61A and 61B (the first partition walls) of the receptacle connector 2 (the first connector) are provided with the first type holding area interposed therebetween so that the contact holding portion 5 (first contact holding portion) is partitioned into the two second type holding areas 52 with the first type holding area 51 interposed therebetween. The surrounding walls 62A and 62B (the first surrounding wall) and the sidewalls 81A, 81B, 82A, and 82B (the second surrounding wall) may be doubly disposed around the outer circumference of each of the two second type holding areas 52. With such a configuration, even when the first contacts that are easily affected by noise are disposed in the respective second type holding areas, the first contacts are separated from each other by a distance that is not easily affected by noise, and the connector device itself is prevented from increasing in size.

Two the partition walls 61A and 61B (the first partition walls) of the receptacle connector 2 (the first connector) may be provided with the first type holding area interposed therebetween so that the contact holding portion 5 (the first contact holding portion) is partitioned into a state in which the first type holding area 51 is interposed between the two second type holding areas 52. The receptacle connector 2 (the first connector) may include the conductive inter-area connecting plate 64 (the first inter-area connecting portion) electrically connecting the first partition wall (for example, the partition wall 61A) disposed on the outer periphery of one second type holding area 52 (for example, the second type holding area 52A) and the first partition wall (for example, the partition wall 61B) disposed on the outer periphery of another second type holding area 52 (for example, the second type holding area 52B). The plug connector 3 (the second connector) may include conductive sidewalls 81A and 81B (the second inter-area connecting portion) electrically connecting the second surrounding wall disposed on the outer periphery of the one second type holding area 52 (for example, the second type holding area 52A) and the second surrounding wall disposed on the outer periphery of the other second type holding area (for example, the second type holding area 52B) when the receptacle connector 2 (the first connector) and the plug connector 3 (the second connector) are fitted to each other. With this configuration, the first inter-area connecting portion and the second inter-area connecting portion are provided on the outer periphery of the first type holding area 51, and noise received by the contacts held in the first type holding area 51 can be suppressed.

The plug connector 3 (the second connector) may further include the insulating contact holding portion 9 (the second contact holding portion) for holding the contact 7 (the second contact). The contact holding portion 9 may include the frame portion 93 and the main body 94. the frame portion 93 and the sidewalls 81A, 81B, 82A, and 82B (the second surrounding wall and the second inter-area connecting portion) may form an annular structure along the outer circumference of the plug connector 3 (the second connector). The main body 94 may be connected to the frame portion 93 in the annular structure. Here, when the receptacle connector 2 (the first connector) and the plug connector 3 (the second connector) are fitted to each other, the main body 94 may be partitioned by the partition walls 61A and 61B (the first partition wall) into the first type holding area 91 that holds two or more contacts 7 (the first type contact 7A; the second contact) and the second type holding area 92 that holds one contact 7 (the second type contact 7B; the second contact)

and does not hold another contact 7 (the second contact). With this configuration, the plug connector 3 (second connector) can be prevented from increasing in size, and the connector device can be reduced in size.

The receptacle connector 2 (the first connector) may have the conductive intra-area connecting plate 63 (the intra-area connecting portion) for electrically connecting the partition walls 61A and 61B (the first partition wall) and the surrounding walls 62A and 62B (the first surrounding wall) to each other in the second type holding area 52. In this case, the contacts disposed in the second type holding area are more isolated from the other contacts, so that noise can be more reliably suppressed.

The intra-area connecting plate 63 (the intra-area connecting portion) may extend to cross the connection direction to the plug connector 3 (the second connector). In this case, by isolating the contact 4 disposed in the second type holding area 52 from other contact 4, noise can be suppressed more reliably.

The intra-area connecting plate 63 (the intra-area connecting portion) may extend to face the plug connector 3 (the second connector). In this case, the intra-area connecting portion can also be used as a guide in connection with the mating connector.

One of the surrounding walls 62A and 62B (the first surrounding wall) and the sidewalls 81A, 81B, 82A, and 82B (second surrounding wall) may be divided on the outer periphery of the second type holding area 52 (92). With the configuration in which one of the first surrounding wall and the second surrounding wall is partially divided, an increase in size of the connector device may be prevented while the noise is reliably suppressed.

The plurality of contacts 4 (the first contacts), the plurality of contacts 7 (the second contacts) or each of the plurality of contacts 4 and the plurality of contacts 7, each of the plurality of contacts include a connecting portion connected to a conductor of a board, a contact portion contacting a contact of a mating connector, and a linking portion linking the connecting portion and the contact portion, and when the receptacle connector 2 (first connector) and the plug connector 3 (second connector) are fitted to each other, the linking direction of the contacts disposed in the first type holding area 51 (91) and the linking direction of the contacts disposed in the second type holding area 52 (92) may intersect each other as viewed from the mating connector. That is, when viewed from the plug connector 3, the connecting direction of the connecting portion 41 and the contact portion 42 by the linking portion 43 in the first type contact 4A and the connecting direction of the connecting portion 41 and the contact portion 42 by the linking portion 43 in the second type contact 4B may intersect each other. When viewed from the receptacle connector 2, the connecting direction of the connecting portion 71 and the contact portion 72 by the linking portion 73 in the first type contact 7A and the connecting direction of the connecting portion 71 and the contact portion 72 by the linking portion 73 in the second type contact 7B may intersect each other.

Hereinafter, a surface along both the connection direction of contact portions 42 and 72 and connecting portions 41 and 71 by contacts (linking portions 43 and 73 of first type contacts 4A and 7A) disposed in the first type holding area and the connection direction of the contact portions 42 and 72 and the connecting portions 41 and 71 by the linking portions 43 and 73 of contacts (the second type contacts 4B and 7B) disposed in the second type area is referred to as an "disposing surface". Here, in the contacts in which the contact portions 42 and 72 and the connecting portions 41 and 71 are connected by the linking portions 43 and 73, the width of the side surface along the connecting direction (hereinafter referred to as "first side surface") tends to be larger than the width of the side surface perpendicular to the connecting direction (hereinafter referred to as "second side surface"). Here, the "side surface" means a surface perpendicular to the disposing surface, and the "width" means a width in a direction along the disposing surface. Due to the configuration in which the connection direction of the contact portions 42 and 72 and the connecting portions 41 and 71 by the linking portions 43 and 73 of the first type contacts 4A and 7A and the connection direction of the contact portions 42 and 72 and the connecting portions 41 and 71 by the linking portions 43 and 73 of the second type contacts 4B and 7B intersect with each other, it is difficult for the first side surface of the first type contacts 4A and 7A and the first side surface of the second type contacts 4B and 7B to face each other in any arrangement. As a result, contacts arrangement suitable for downsizing the connector may be adopted while noise propagation between the contacts disposed in the first type area and the contact disposed in the second type area is suppressed.

Two the partition walls 61A and 61B (the first partition wall) of the receptacle connector 2 (the first connector) may be provided with the first type holding area 51 interposed therebetween so that the contact holding portion 5 (the first contact holding portion) is partitioned into a state in which the first type holding area 51 is interposed between the two second type holding areas 52. The receptacle connector 2 (the first connector) may include the conductive inter-area connecting plate 64 (the first inter-area connecting portion) electrically connecting the first partition wall (e.g., the partition wall 61A) disposed on the outer periphery of one second type holding area 52 (e.g., the second type holding area 52A) and the first partition wall (e.g., the partition wall 61B) disposed on the outer periphery of another the second type holding area 52 (e.g., the second type holding area 52B) when the receptacle connector 2 (the first connector) and the plug connector 3 (the second connector) are fitted to each other. In this case, each of the first type contacts 4A (the first contacts) disposed in the first type holding area 51 may include the connecting portion 41 connected to a conductor in a board. The connecting portion 41 of the first type contact 4A (the first contact) disposed in the first type holding area 51 may be disposed so as to protrude toward the inter-area connecting plate 64 (the first inter-area connecting portion), and the connecting portion 41 of the first type contact 4A (first contact) disposed in the first type holding area 51 may be visible in plan view. Since the connecting portions of the contacts disposed in the first type holding area are disposed to face the first inter-area connecting portion, noise may be further suppressed by the first inter-area connecting portion. In addition, when the connecting portion of the contacts disposed in the first type holding area is visible in plan view, the mounting state of the connecting portion on the board can be monitored.

The first connector may be the receptacle connector 2, the second connector may be the plug connector 3, and, when the first connector and the second connector are fitted to each other, the second surrounding wall may be provided outside the first surrounding wall. With such a configuration, since the second surrounding wall of the plug connector 3 is provided outside the receptacle connector 2 including the intra-area connecting plate 63 (the intra-area connecting portion), the guiding property in connection with the mating connector may be enhanced.

The receptacle connector 2 is a connector which is attached to the board and connected (fitted) to the plug connector 3. The receptacle connector includes a plurality of conductive contacts 4 each of which are connected to a plurality of signal conductor exposing portions 121 to 126 of the circuit board 101, the insulating contact holding portion 5 holding the plurality of contacts 4, and at least one conductive partition wall 61 electrically connected to ground conductor exposing portions 111 to 116 of the circuit board 101 and partitioning the contact holding portion 5 into a plurality of holding areas. The plurality of holding areas includes the first type holding area 51 holding the plurality of contacts 4 and the second type holding area 52 holding one contact 4 and not holding another contact 4.

In the receptacle connector 2, the plurality of contacts 4 (for example, contacts for low-frequency signals) that are unlikely to be a noise source are collectively disposed in the first type holding area 51, and the contact 4 (for example, contacts for high-frequency signals) that are likely to be a noise source and are likely to be affected by noise are disposed in the second type holding area 52 while being isolated from other the contact 4, thereby achieving both downsizing and noise suppression.

The plurality of contacts 4 may include the plurality of first type contacts 4A disposed in the first type holding area 51 and the second type contact 4B, which are different types of contacts from the plurality of first type contacts 4A, disposed in the second type holding area 52. In this case, by selectively using the first type holding area 51 and the second type holding area 52 in accordance with the type of the contact 4, noise can be suppressed more reliably.

The plurality of holding areas may comprise two second type holding areas 52A and 52B, and the at least one partition wall 61 may include two partition walls 61A and 61B doubly interposed between the two second type holding areas 52A and 52B. In this case, by interposing the two partition walls 61A and 61B between the second type holding areas 52A and 52B, the contact 4 disposed in the second type holding areas 52A and 52B can be further isolated. Therefore, noise can be suppressed more reliably.

At least one first type holding area 51 may be interposed between the two partition walls 61A and 61B. In this case, since the second type holding areas 52A and 52B are separated from each other by the first type holding area 51, the contacts 4 disposed in the second type holding areas 52A and 52B can be further isolated from each other. Therefore, noise can be suppressed more reliably.

The receptacle connector 2 may further include the conductive surrounding wall 62 aligned with the partition wall 61 along the periphery of the second type holding area 52. In this case, by isolating the contact 4 disposed in the second type holding area 52 from other contacts 4, noise can be suppressed more reliably.

The receptacle connector 2 may further include the conductive intra-area connecting plate 63 that electrically connects the partition wall 61 and the surrounding wall 62 disposed along the outer periphery of the second type holding area 52 to each other. In this case, by isolating the contact 4 disposed in the second type holding area 52 from another contact 4, noise can be suppressed more reliably.

The intra-area connecting plate 63 may extend across the connection direction CD1 to the plug connector 3. In this case, by isolating the contact 7 disposed in the second type holding area 52 from other contacts 4, noise can be suppressed more reliably.

The intra-area connecting plate 63 may be disposed to face the plug connector 3. In this case, the intra-area connecting plate 63 can also be used as a guide in connection with the plug connector 3.

The receptacle connector 2 may further include, for each of the two second type holding areas 52, the conductive surrounding wall 62 aligned with the partition wall 61 along the outer periphery of the second type holding area 52, and may further include, for each of the two second type holding areas 52A and 52B, the conductive intra-area connecting plate 63 electrically connecting the partition wall 61 and the surrounding wall 62 disposed along the outer periphery of the second type holding area 52 to each other. The receptacle connector 2 may further include the conductive inter-area connecting plate 64 that electrically connects the partition wall 61A on the outer periphery of one second type holding area 52A and the partition wall 61B on the outer periphery of another the second type holding area 52B. In this case, by isolating the contact 4 disposed in the second type holding area 52 from other contacts 4, noise can be suppressed more reliably.

At least one first type holding area 51 may be interposed between the two partition walls 61A and 61B, and the inter-area connecting plate 64 may be along the perimeter of the first type holding area 51. In this case, since the inter-area connecting plate 64 is disposed on the outer periphery of the first type holding area 51, an arrangement space for the plurality of contacts 4 may be secured in the first type holding area 51. In addition, since the first type holding area is surrounded by the partition wall 61 and the inter-area connecting plate 64, the plurality of contacts 4 of the first type holding area 51 can be isolated from other the contact 4. Therefore, noise can be suppressed more reliably.

Each of the plurality of contacts 4 may have the connecting portion 41 connected to the signal conductor exposing portions 121 to 126 of the circuit board 101, and the connecting portion 41 may face the inter-area connecting plate 64 in directions along the two partition walls 61A and 61B. In this case, noise can be further suppressed by the clearance between the inter-area connecting plate 64 and the connecting portion 41 of the contact 4.

The partition wall 61 may include the end edge 611 that contacts the circuit board 101 and may be electrically connected to ground conductor exposing portions 111, 112 of the circuit board 101 at the end edge 611. In this case, noise suppression can be more reliably achieved by strengthening the electrical shielding action of the partition wall 61.

The receptacle connector 2 is a connector attached to the circuit board 101 and connected to the plug connector 3. The receptacle connector 2 includes a plurality of conductive contacts 4 respectively connected to the plurality of signal conductor exposing portions 121 to 126 of the circuit board 101 and the insulating contact holding portion 5 holding the plurality of contacts 4. The contact holding portion 5 is partitioned into the first type holding area 51 and the two second type holding areas 52A and 52B sandwiching the first type holding area 51. The first type holding area 51 holds the plurality of contacts 4, and the second type holding area holds one contact 4 and does not hold another contact 4. The plug connector 3 is a connector attached to the circuit board 102 and connected to the receptacle connector 2. The plug connector 3 includes the plurality of conductive contacts 7 respectively connected to a plurality of signal conductor exposing portions 141 to 146 of the circuit board 102 and the insulating contact holding portion 9 holding the plurality of contacts 7. The contact holding portion 9 is partitioned into the first type holding area 91 and the two second type holding areas 92A and 92B sandwiching the first type holding area 91. The first type holding area 91 holds the plurality of contacts 7, and the second type holding area holds one contact 7 and does not hold another contact 7.

In the receptacle connector 2 and the plug connector 3, the plurality of contacts 4 and 7, which are unlikely to be a noise source, are collectively disposed in the first type holding area 51 and 91, and contacts 4 and 7, which are likely to be a noise source and are likely to be affected by noise, are disposed in the second type holding areas 52A, 52B, 92A, and 92B while being isolated from other the contacts 4 and 7, thereby achieving both downsizing and suppression of noise.

The plurality of contacts 4 may include the plurality of first type contacts 4A disposed in the first type holding area 51 and the second type contact 4B disposed in the second type holding areas 52A and 52B, which are the contact 4 of a type different from the plurality of first type contacts 4A. The plurality of contacts 7 may include the plurality of first type contacts 7A disposed in the first type holding area 91 and the second type contact 7B disposed in the second type holding areas 92A and 92B, which are the contact 7 of a type different from the plurality of first type contacts 7A. In this case, by selectively using the first type holding area 51 and 91 and the second type holding area 52A, 52B, 92A, and 92B in accordance with the type of the contact 4 and 7, noise can be suppressed more reliably.

The second type contact 4B may be a contact that transmits a higher frequency signal compared to a signal transmitted by the first type contact 4A. The second type contact 7B may be a contact that transmits a higher frequency signal compared to a signal transmitted by the first type contact 7A. In this case, by disposing the contacts 4 and 7 for transmitting the higher frequency signal in the second type holding areas 52A, 52B, 92A, and 92B to be isolated from other contacts 4 and 7, noise can be suppressed more reliably.

The first type holding area 51 and the two second type holding areas 52A and 52B sandwiching the first type holding area 51 may be partitioned by air gaps S11 and S12 formed in the contact holding portion 5. The first type holding area 91 and the two second type holding areas 92A and 92B sandwiching the first type holding area 91 may be partitioned by air gaps S21 and S22 formed in the contact holding portion 9. In this case, noise can be more reliably suppressed by disposing the conductive members in air gaps S11, S12, S21, and S22.

Each of the plurality of contacts 4 may include the connecting portion 41 connected to the signal conductor exposing portions 121 to 126 of the circuit board 101, the contact portion 42 contacting the contact 7 of the plug connector 3, and the linking portion 43 linking the connecting portion 41 and the contact portion 42. All of the plurality of contacts 4 may be disposed such that the linking direction of the contact portion 42 and the connecting portion 41 by the linking portion 43 is along the same direction when viewed from the plug connector 3. Each of the plurality of contacts 7 may include the connecting portion 71 connected to the signal conductor exposing portions 141 to 146 of the circuit board 102, the contact portion 72 contacting the contact 4 of the receptacle connector 2, and the linking portion 73 linking the connecting portion 71 and the contact portion 72. All of the plurality of contacts 7 may be disposed such that the linking direction of the contact portion 72 and the connecting portion 71 by the linking portion 73 is along the same direction when viewed from the receptacle connector 2. In this case, by aligning the direction in which the contact portions 42 and 72 and the connecting portions 41 and 71 are disposed, downsizing may more reliably be achieved.

Each of the plurality of contacts 4 may have the connecting portion 41 connected to the signal conductor exposing portions 121 to 126 of the circuit board 101 and the contact portion 42 contacting the contact 7 of the plug connector 3, and all of the plurality of contacts 4 may be disposed such that the contact direction between the contact portion 42 and the contact 7 of the plug connector 3 is along the same direction as viewed from the plug connector 3. Each of the plurality of contacts 7 may have the connecting portion 71 connected to the signal conductor exposing portions 141 to 146 of the circuit board 102 and the contact portion 72 contacting the contact 4 of the receptacle connector 2, and all of the plurality of contacts 7 may be disposed such that the contact direction between the contact portion 72 and the contact 4 of the receptacle connector 2 is along the same direction as viewed from the receptacle connector 2. In this case, by disposing the contacts 4 and 7 in the same direction, downsizing may more reliably be achieved.

Both the first type holding area 91 and the second type holding areas 92A and 92B may have retaining ridges 911A, 911B, and 921 protruding from the base toward the receptacle connector 2 along the same direction, and in both the first type holding area 91 and the second type holding areas 92A and 92B, the contact portions of all the contact 7 may be exposed to outer surfaces 913, 914, 923, and 924 of the retaining ridges 911A, 911B, and 921. In this case, by aligning the arrangement directions of the contact 7 by the retaining ridges 911A, 911B, and 921, downsizing may more reliably be achieved.

Both the first type holding area 51 and the second type holding areas 52A and 52B may have accommodating grooves 511A, 511B, and 521 along the same direction, and in both the first type holding area 51 and the second type holding areas 52A and 52B, the contact portion 42 of all the contact 4 may be disposed so as to be exposed to the accommodating grooves 511A, 511B, and 521. In this case, by aligning the arrangement directions of the contact 4 by the accommodating grooves 511A, 511B, and 521, downsizing may more reliably be achieved.

When viewed from the plug connector 3, the linking direction of the connecting portion 41 and the contact portion 42 by the linking portion 43 of the first type contact 4A and the linking direction of the connecting portion 41 and the contact portion 42 by the linking portion 43 of the second type contact 4B may intersect each other. When viewed from the receptacle connector 2, the linking direction of the connecting portion 71 and the contact portion 72 by the linking portion 73 of the first type contact 7A and the linking direction of the connecting portion 71 and the contact portion 72 by the linking portion 73 of the second type contact 7B may cross each other. Hereinafter, a plane along both of the linking direction of the contact portions 42, and 72 and the connecting portions 41 and 71 by the linking portions 43 and 73 of the first type contacts 4A and 7A and the linking direction of the contact portions 42 and 72 and the connecting portions 41 and 71 by the linking portions 43 and 73 of the second type contacts 4B and 7B is referred to as an "disposing surface". In contacts in which the contact portions 42 and 72 and the connecting portions 41 and 71 are linked by the linking portions 43 and 73, the width of the side surface along the connecting direction (hereinafter referred to as "first side surface") tends to be larger than the width of the side surface perpendicular to the connecting direction (hereinafter referred to as "second side surface").

Here, the "side surface" means a surface perpendicular to the disposing surface, and the "width" means a width in a direction along the disposing surface. Due to the configuration in which the linking direction of the contact portions 42 and 72 and the connecting portions 41 and 71 by the linking portions 43 and 73 of the first type contacts 4A and 7A and the linking direction of the contact portions 42 and 72 and the connecting portions 41 and 71 by the linking portions 43 and 73 of the second type contacts 4B and 7B intersect with each other, it is difficult for the first side surface of the first type contacts 4A and 7A and the first side surface of the second type contacts 4B and 7B to face each other in any arrangement. Accordingly, a contacts arrangement suitable for downsizing the connector may be adopted while noise propagation between the first type contacts 4A and 7A and the second type contacts 4B and 7B is suppressed.

When viewed from the plug connector 3, the linking direction of the contact portion 42 and the connecting portion 41 by the linking portion 43 of the first type contact 4A and the linking direction of the contact portion 42 and the connecting portion 41 by the linking portion 43 of other first type contact 4A may be parallel to each other. When viewed from the receptacle connector 2, the linking direction of the contact portion 72 and the connecting portion 71 by the linking portion 73 of the first type contact 7A and the linking direction of the contact portion 72 and the connecting portion 71 by the linking portion 73 of other first type contact 7A may be parallel to each other. In this case, the first side surface of the first type contacts 4A and 7A and the first side surface of the other first type contacts 4A and 7A are made to face each other, thereby the size of the connector may further be reduced.

When viewed from the plug connector 3, the direction in which the contact portion 42 of the first type contact 4A contacts the contact 7 of the plug connector 3 and the direction in which the contact portion 42 of the second type contact 4B contacts the contacts of the plug connector 3 may intersect each other. When viewed from the receptacle connector 2, the direction in which the contact portion 72 of the first type contact 7A contacts the contact 4 of the receptacle connector 2 and the direction in which the contact portion 72 of the second type contact 7B contacts the contact 4 of the receptacle connector 2 may intersect each other. Hereinafter, a combination of contacts (contacts of the own connector) and contacts of the mating connector that contacts the contacts is referred to as a "contact combination". The direction in which the contacts of the own connector come into contact with the contacts of the mating connector is referred to as a "contact direction". A surface along both the contact direction of the first type contacts 4A and 7A and the contact direction of the second type contacts 4B and 7B is referred to as an "disposing surface". In the contact combination, the width of the side along the contact direction (hereinafter referred to as "first side surface") tends to be larger than the width of the side perpendicular to the contact direction (hereinafter referred to as "second side surface"). Here, the "side surface" means a surface perpendicular to the disposing surface, and the "width" means a width in a direction along the disposing surface. Due to the configuration in which the direction in which the contact portions 42 and 72 of the first type contacts 4A and 7A come into contact with the contacts of the mating connector and the direction in which the contact portions 42 and 72 of the second type contacts 4B and 7B come into contact with the contacts of the mating connector intersect with each other, it is difficult for the first side surface of the contact combination of the first type contacts 4A and 7A and the first side surface of the contact combination of the second type contacts 4B and 7B to face each other in any arrangement. Accordingly, a contacts arrangement suitable for downsizing the connector may be adopted while noise propagation between the contact combination of the first type contacts 4A and 7A and the contact combination of the second type contacts 4B and 7B may be suppressed.

When viewed from the plug connector 3, the direction in which the contact portion 42 of the first type contact 4A contacts the contact 7 of the plug connector 3 and the direction in which the contact portion 42 of other first type contact 4A contacts the contact 7 of the plug connector 3 may be parallel to each other. When viewed from the receptacle connector 2, the direction in which the contact portion 72 of the first type contact 7A contacts the contact 4 of the receptacle connector 2 and the direction in which the contact portion 72 of other first type contact 7A contacts the contact 4 of the receptacle connector 2 may be parallel to each other. In this case, the first side surface of the contact combination of the first type contacts 4A and 7A and the first side surface of the contact combination of the other first type contacts 4A and 7A are opposed to each other, so that the connector may further be downsized.

The first type holding area 91 may have the retaining ridges 911A and 911B protruding from the base along one direction toward the plug connector 3 and the second type holding area 92 may have the retaining ridge 921 protruding from the base along a direction intersecting the one direction toward the plug connector 3. The contact portion 72 of all the contacts 7 may be exposed to the side surface of the retaining ridges 911A, 911B, 921 in both the first type holding area 91 and the second type holding area 92. In this case, the retaining ridges 911A, 911B, and 921 can more reliably assure that the linking direction of the first type contact 7A and the linking direction of the second type contact 7B intersect and that the contact direction of the first type contact 7A and the contact direction of the second type contact 7B intersect. This may further reduce the size of the connector.

The first type holding area 51 may have the accommodating grooves 511A and 511B along one direction and the second type holding area 52 may have the accommodating groove 521 along a direction intersecting the one direction. In both the first type holding area 51 and the second type holding area 52, all the contacts 4 may be disposed to expose the contact portion 42 to the accommodating grooves 511A, 511B, and 521. In this case, the accommodating grooves 511A, 511B, and 521 can more reliably assure that the connection direction of the first type contact 4A and the connection direction of the second type contact 4B intersect and that the contact direction of the first type contact 4A and the contact direction of the second type contact 4B intersect. This may further reduce the size of the connector.

When viewed from the plug connector 3, the connecting portion 41 of all the contacts 4 may be disposed inward of the outer edge of the contact holding portion 5 (the edge having the largest dimension in the long side direction DL1 and the short side direction DS1). When viewed from the receptacle connector 2, the connecting portion 71 of all the contacts 7 may be disposed inward of the outer edge of the contact holding portion 9 (the edge having the largest dimension in the long side direction DL1 and the short side direction DS1).

The plurality of contacts 4 disposed in the first type holding area 51 may include the plurality of contacts 4 disposed along an arrangement direction perpendicular to the boundaries PL11 and PL12 of the first type holding area 51 and the second type holding areas 52A and 52B. The interval G11 in the arrangement direction of the contacts 4 adjacent to each other via the boundaries PL11 and PL12 may be larger than the interval G12 of the contacts 4 adjacent to each other along the arrangement direction in the first type holding area 51. The plurality of contacts 7 disposed in the first type holding area 91 may include the plurality of contacts 7 disposed along an arrangement direction perpendicular to the boundaries PL21 and PL22 of the first type holding area 91 and the second type holding areas 92A and 92B. The interval G21 in the arrangement direction of the contacts 7 adjacent to each other via the boundaries PL21 and PL22 may be larger than the interval G22 of the contacts 7 adjacent to each other along the arrangement direction in the first type holding area 91. In this case, by isolating the second type contacts 4B and 7B from other the contacts 4 and 7, noise can be suppressed more reliably.

Figure 16:
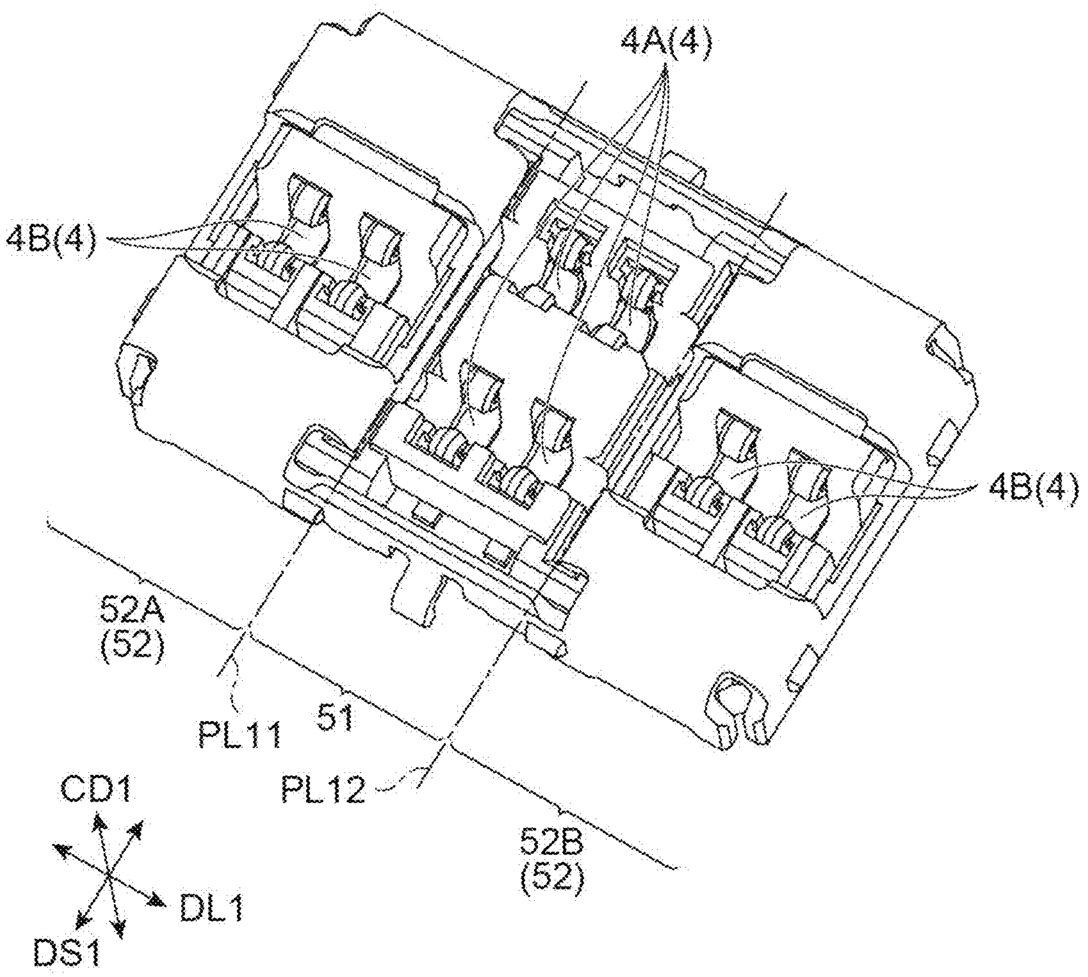
FIG. 16 is a perspective view illustrating a modification of the receptacle connector.
Figure 17:
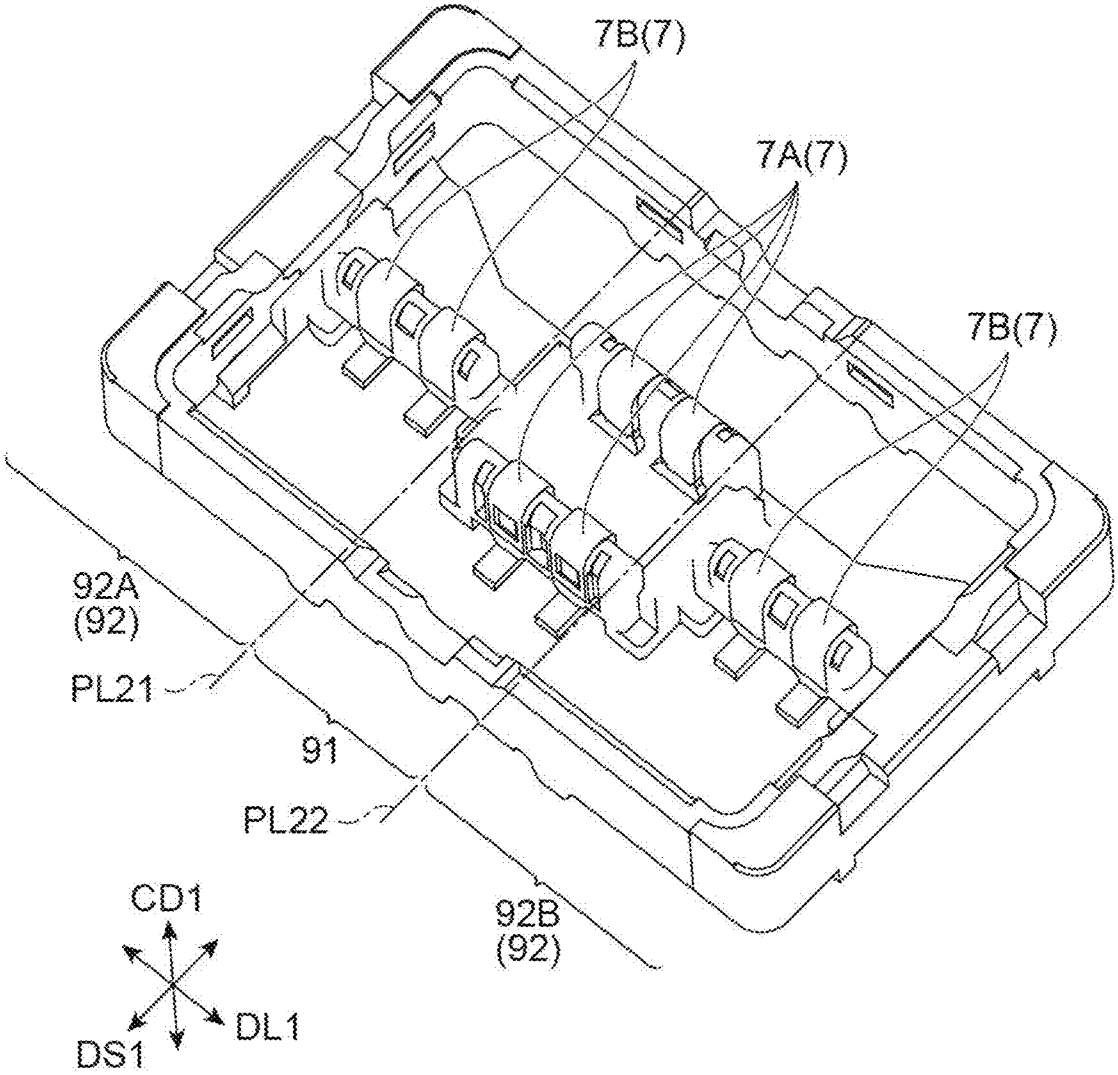
FIG. 17 is a perspective view illustrating a modification of the plug connector.

Although the above-described examples assume that one signal is transmitted by one contact, one signal may be transmitted by one pair of contacts (two contacts) such as in a differential signal. In such a case, the second type holding area 52 may hold one pair of the second type contact 4B and the second type holding area 92 may hold one pair of the second type contact 7B, as illustrated in FIG. 16 and FIG. 17. That is, the plurality of holding areas of the contact holding portion 5 may include the first type holding area 51 holding the plurality of contacts 4 transmitting a plurality of signals and the second type holding area 52 holding one pair of the contact 4 transmitting one signals and not holding another contact 4. Also, the plurality of holding areas of the contact holding portion 9 may include the first type holding area 91 holding the plurality of contacts 7 transmitting a plurality of signals and the second type holding area 92 holding one pair of the contact 7 transmitting one signal and not holding another contact 7.

In the receptacle connector 2, as viewed from the connection direction CD1 (as viewed from the plug connector 3), the linking direction of the connecting portion 41 and the contact portion 42 by the linking portion 43 of the first type contact 4A and the linking direction of the connecting portion 41 and the contact portion 42 by the linking portion 43 of the second type contact 4B may intersect (e.g., be orthogonal to) each other. The linking direction of the connecting portion 41 and the contact portion 42 by the linking portion 43 of the first type contact 4A and the linking direction of the connecting portion 41 and the contact portion 42 by the linking portion 43 of other first type contacts 4A may be parallel to each other.

When viewed from the connection direction CD1, the direction in which the contact portion 42 of the first type contact 4A contacts the contact 7 of the plug connector 3 and the direction in which the contact portion 42 of the second type contact 4B contacts the contact 7 of the plug connector 3 may intersect each other. The direction in which the contact portion 42 of the first type contact 4A contacts the contact 7 of the plug connector 3 and the direction in which the contact portion 42 of another first type contact 4A contacts the contact 7 of the plug connector 3 may be parallel to each other.

Figure 18:
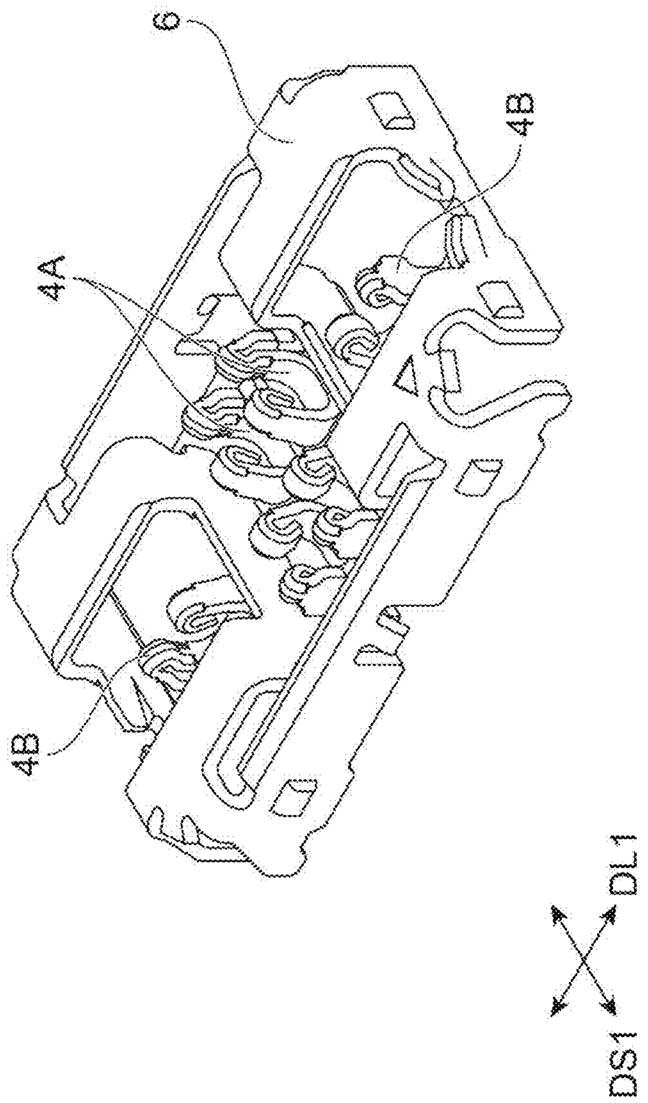
FIG. 18 is a perspective view illustrating another modification of the receptacle connector.
Figure 19:
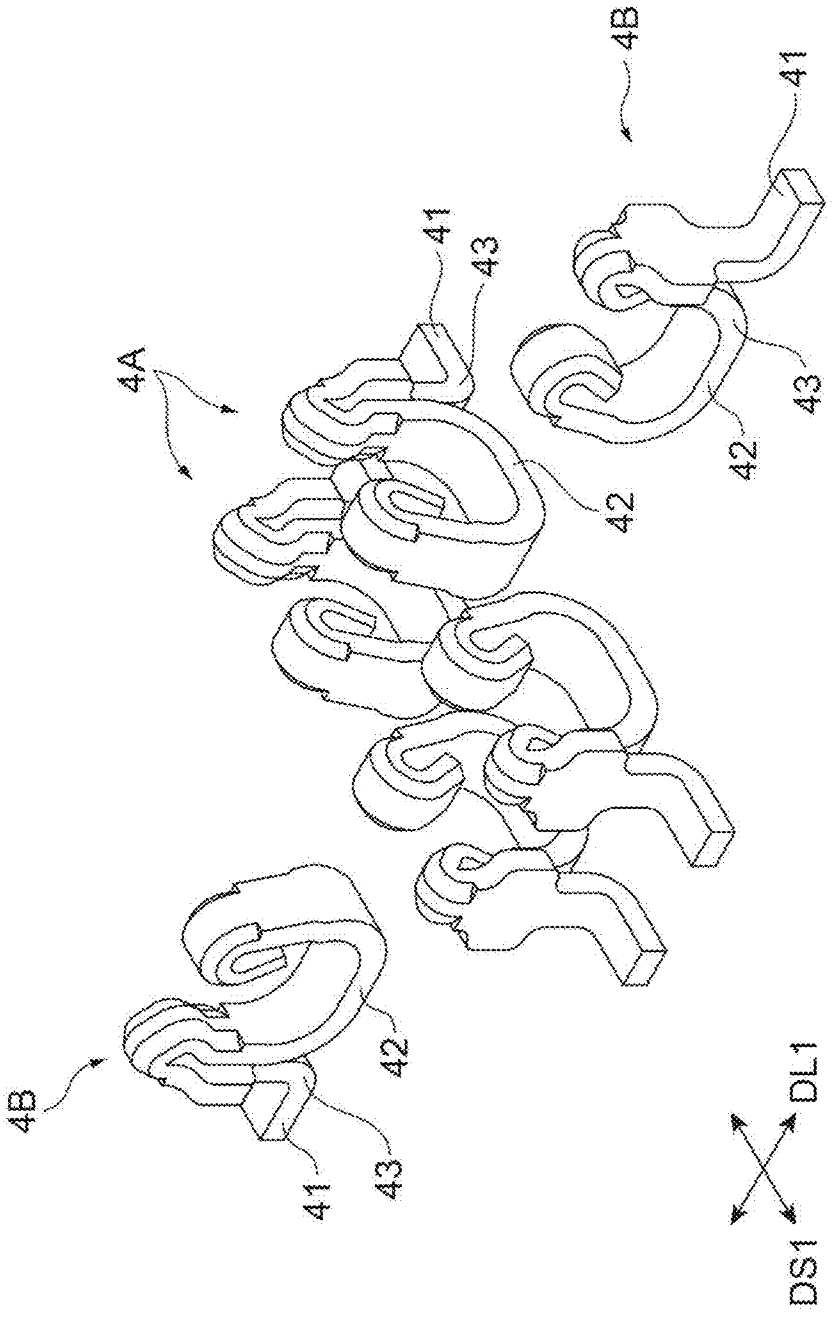
FIG. 19 is a perspective view illustrating the arrangement of contacts in FIG. 18.
Figure 20:
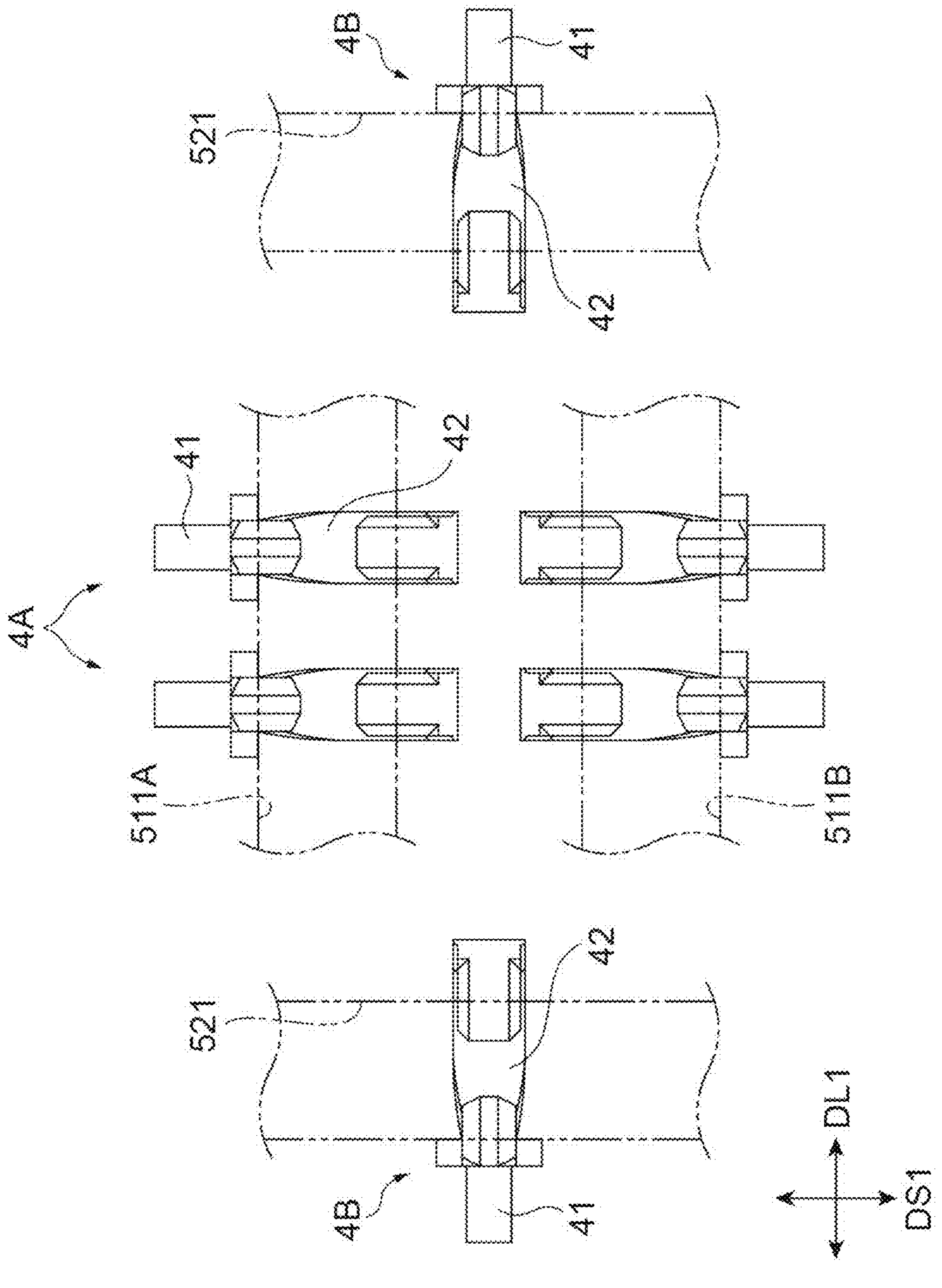
FIG. 20 is a plan view illustrating the arrangement of contacts in FIG. 18.

FIG. 18, FIG. 19, and FIG. 20 illustrate an example of a case in which the linking direction of the connecting portion 41 and the contact portion 42 by the linking portion 43 of the first type contact 4A and the linking direction of the connecting portion 41 and the contact portion 42 by the linking portion 43 of the second type contact 4B intersect each other. In all the figures, the contact holding portion 5 and the shell 6 are not shown. In the examples of FIG. 18, FIG. 19 and FIG. 20, in any of the first type contacts 4A, the direction in which the linking portion 43 links the connecting portion 41 and the contact portion 42 is along the short side direction DS1, and the direction in which the contact portion 42 contacts the contact 7 is also along the short side direction DS1. In contrast, in the second type contact4B, the direction in which the linking portion 43 connects the connecting portion 41 and the contact portion 42 is along the long side direction DL1, and the direction in which the contact portion 42 contacts the contact 7 is also along the long side direction DL1. Also in the configuration of FIG. 18, FIG. 19, and FIG. 20, the connecting portion 41 of all the contacts 4 are disposed inward of the outer edge of the contact holding portion 5 (the edge portion having the largest dimension in the long side direction DL1 and the short side direction DS1) when viewed from the connection direction CD1. In this configuration, the accommodating grooves 511A and 511B of the first type holding area 51 are along the long side direction DL1, while the accommodating groove 521 of the second type holding areas 52A and 52B are along the short side direction DS1 (see FIG. 20).

The linking portion 43 of the first type contact 4A may connect the connecting portion 41 and the contact portion 42 along the long side direction DL1, and the linking portion 43 of the second type contact 4B may connect the connecting portion 41 and the contact portion 42 along the short side direction DS1. In this case, in the first type holding area 51, the plurality of first type contacts 4A may be disposed along the short side direction DS1.

In the plug connector 3, as viewed from the connection direction CD1 (as viewed from the receptacle connector 2), the linking direction of the connecting portion 71 and the contact portion 72 by the linking portion 73 of the first type contact 7A and the linking direction of the connecting portion 71 and the contact portion 72 by the linking portion 73 of the second type contact 7B may intersect (e.g., be orthogonal to) each other. The linking direction of the connecting portion 71 and the contact portion 72 by the linking portion 73 of the first type contact 7A and the linking direction of the connecting portion 71 and the contact portion 72 by the linking portion 73 of another first type contact 7A may be parallel to each other.

When viewed from the connection direction CD1, the direction in which the contact portion 72 of the first type contact 7A contacts the contact 4 of the receptacle connector 2 and the direction in which the contact portion 72 of the second type contact 7B contacts the contact 4 of the receptacle connector 2 may intersect each other. The direction in which the contact portion 72 of the first type contact 7A contacts the contact 4 of the receptacle connector 2 and the direction in which the contact portion 72 of another first type contact 7A contacts the contact 4 of the receptacle connector 2 may be parallel to each other.

Figure 21:
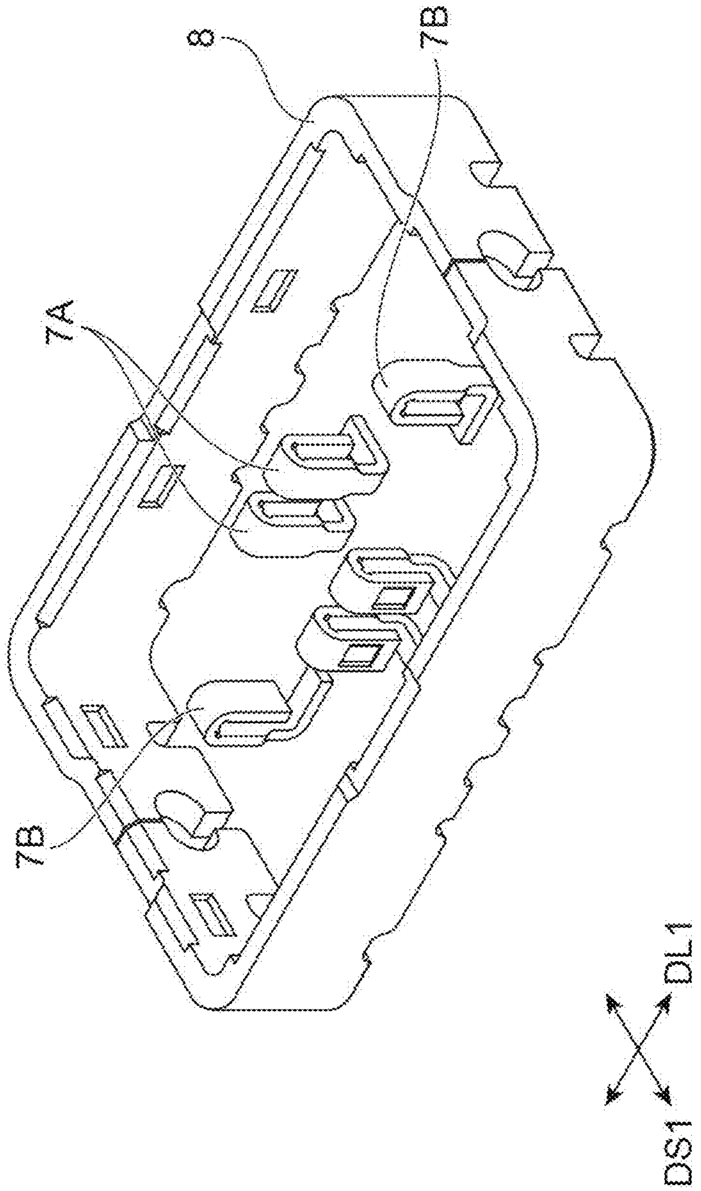
FIG. 21 is a perspective view illustrating another modification of the plug connector.
Figure 22:
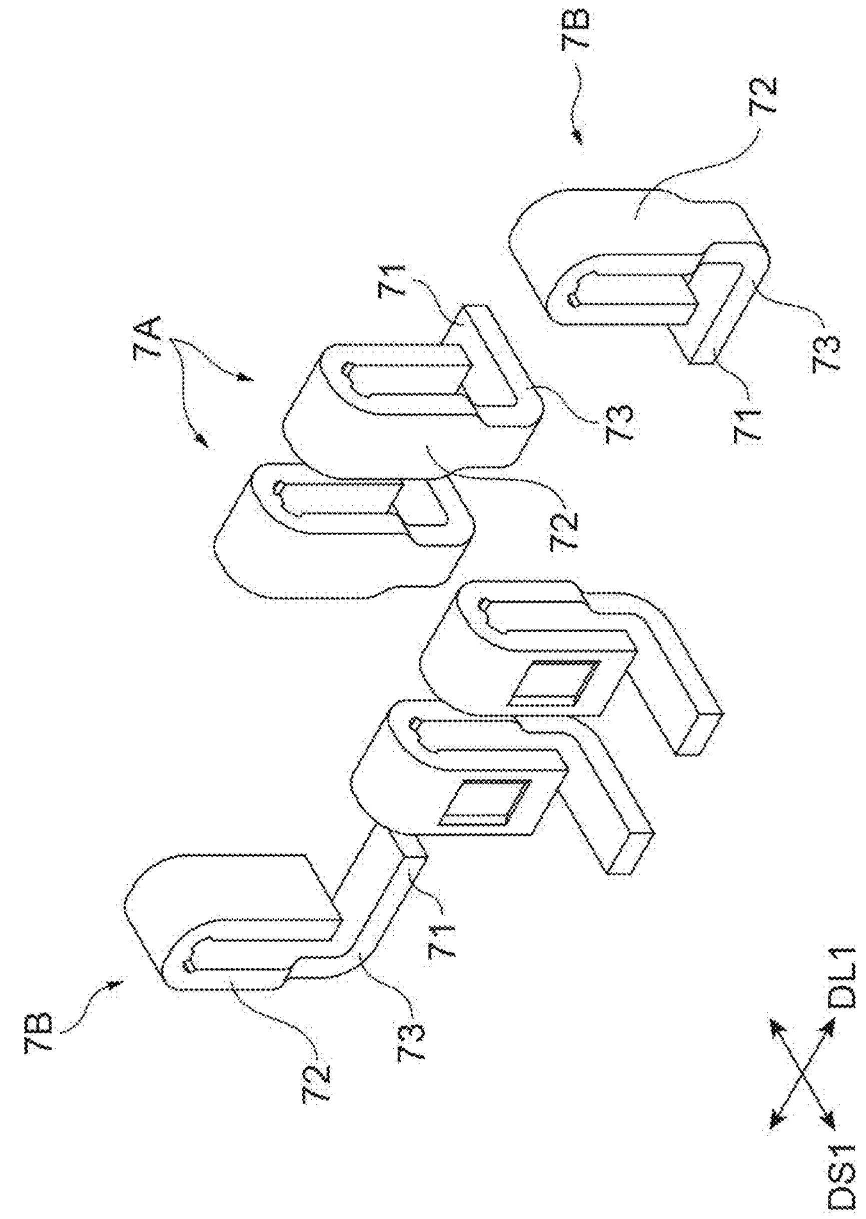
FIG. 22 is a perspective view illustrating the arrangement of contacts in FIG. 21.
Figure 23:
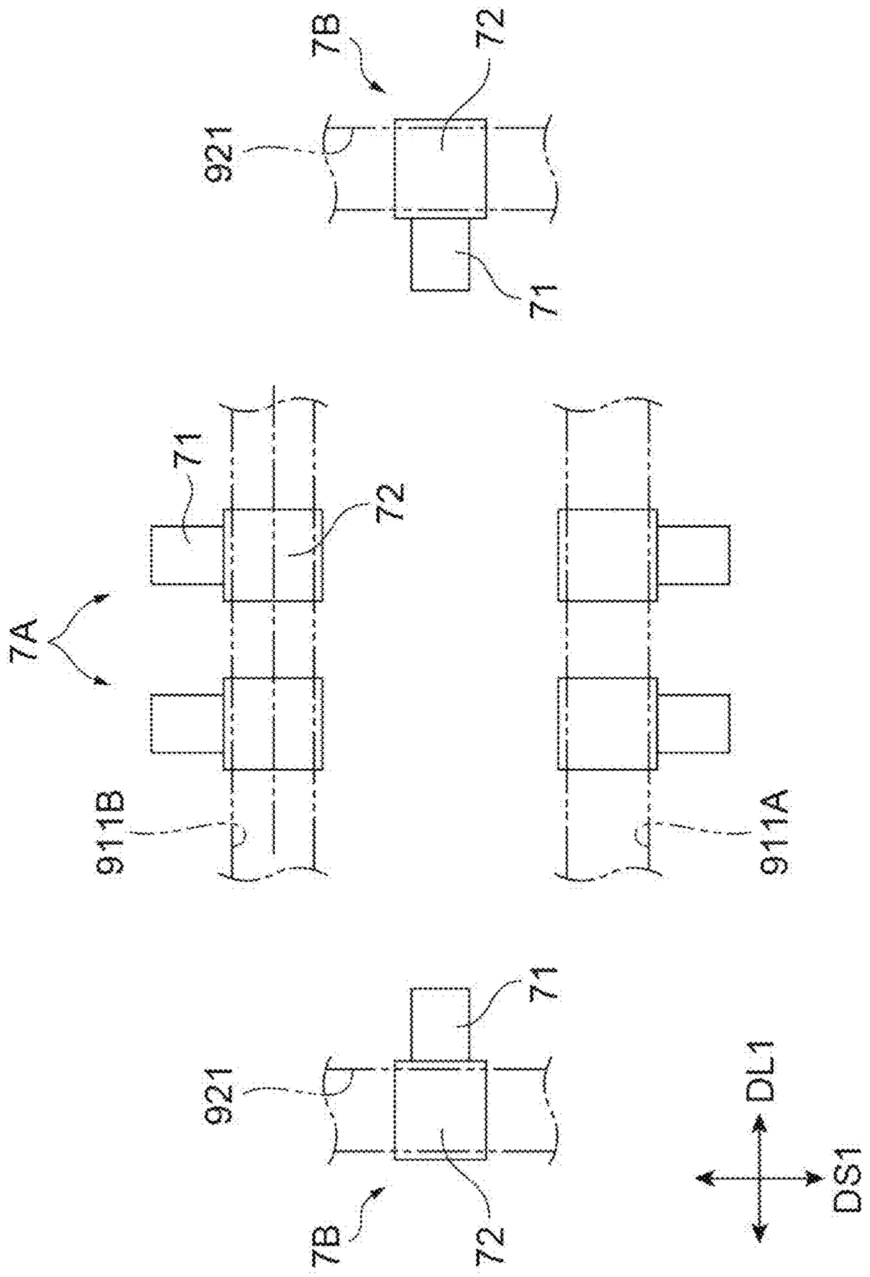
FIG. 23 is a plan view illustrating the arrangement of contacts in FIG. 21.

FIG. 21, FIG. 22, and FIG. 23 illustrate an example of a case in which the linking direction of the connecting portion 71 and the contact portion 72 by the linking portion 73 of the first type contact 7A and the linking direction of the connecting portion 71 and the contact portion 72 by the linking portion 73 of the second type contact 7B intersect each other. In all the figures, the shell 8 and the contact holding portion 9 are not shown. In the examples of FIG. 21, FIG. 22 and FIG. 23, in any of the first type contacts 7A, the direction in which the linking portion 73 links the connecting portion 71 and the contact portion 72 is along the short side direction DS1, and the direction in which the contact portion 72 contacts the contact 4 is also along the short side direction DS1. In contrast, in the second type contact 7B, the direction in which the linking portion 73 links the connecting portion 71 and the contact portion 72 is along the long side direction DL1, and the direction in which the contact portion 72 contacts the contact 4 is also along the long side direction DL1. Also in the configuration of FIG. 21, FIG. 22, and FIG. 23, the connecting portion 71 of all the contacts 7 are disposed inward of the outer edge of the contact holding portion 9 (the edge portion having the largest dimension in the long side direction DL1 and the short side direction DS1) when viewed from the connection direction CD1. In this configuration, the retaining ridges 9911A and 911B of the first type holding area 91 are along the long side direction DL1, while the retaining ridge 921 of the second type holding area 92 are along the short side direction DS1 (see FIG. 23).

The direction in which the linking portion 73 of the first type contact 7A links the connecting portion 71 and the contact portion 72 may be along the long side direction DL1, and the direction in which the linking portion 73 of the second type contact 7B links the connecting portion 71 and the contact portion 72 may be along the short side direction DS1. In this case, in the first type holding area 91, the plurality of first type contacts 7A may be disposed along the short side direction DS1.

Supplementary Note

A connector according to an aspect of the present disclosure is a connector attached to a board and connected to a mating connector. The connector comprises: a plurality of conductive contacts each connected to a plurality of conductors to a board, an insulating contact holding portion which holds the plurality of contact, and at least one conductive partition wall which is electrically connected to a ground of the board and which partitions the contact holding portion into a plurality of holding areas. The plurality of holding areas includes a first type holding area that holds the plurality of contacts and a second type holding area that holds one contact and does not hold the other contacts.

According to this connector, a plurality of contacts that are unlikely to be a noise source are collectively disposed in the first type holding area, and contacts that are likely to be a noise source and are likely to be affected by noise are disposed in the second type holding area so as to be isolated from the other contacts. Thus, both downsizing and suppression of noise can be achieved.

The plurality of contacts may include a plurality of first type contacts disposed in the first type holding area and a second type contact disposed in the second type holding area, the second type contact being a type of contacts different from the plurality of first type contacts. In this case, by selectively using the first type holding area and the second type holding area according to the type of contacts, noise can be suppressed more reliably.

The plurality of holding areas may include two second type holding areas, and the at least one partition wall may include two partition walls doubly interposed between the two second type holding areas. In this case, by interposing double partition walls between the second type holding areas, the contacts disposed in the second type holding areas can be further isolated from each other. Therefore, noise can be suppressed more reliably.

At least one first type holding area may be interposed between the two partition walls. In this case, since the second type holding areas are separated from each other by the interposition of the first type holding area, the contacts disposed in the second type holding areas can be further isolated from each other. Therefore, noise can be suppressed more reliably.

The connector may further include a conductive surrounding wall aligned with the partition wall along an outer periphery of the second type holding area. In this case, the contacts disposed in the second type holding area are more isolated from the other contacts, so that noise can be more reliably suppressed.

The connector may further include a conductive intra-area connecting portion electrically connecting the partition wall and the surrounding wall disposed along the outer periphery of the second type holding area to each other. In this case, the contacts disposed in the second type holding area are more isolated from the other contacts, so that noise can be more reliably suppressed.

The intra-area connecting portion may extend across a connection direction to a mating connector. In this case, the contacts disposed in the second type holding area are more isolated from the other contacts, so that noise can be more reliably suppressed.

The intra-area connecting portion may be disposed to face the mating connector. In this case, the intra-area connecting portion can also be used as a guide in connection with the mating connector.

The connector may further include a conductive surrounding wall aligned with the partition wall along the outer periphery of the second type holding area for each of the two second type holding areas, and may further include a conductive intra-area connecting portion electrically connecting the partition wall and the surrounding wall aligned along the outer periphery of the second type holding area to each other for each of the two second type holding areas. The connector may further include a conductive inter-area connecting portion electrically connecting the partition wall on the outer periphery of one second type holding area and the partition wall on the outer periphery of the other second type holding area. In this case, the contacts disposed in the second type holding area are more isolated from the other contacts, so that noise can be more reliably suppressed.

At least one first type holding area may be interposed between the two partition walls, and the inter-area connecting portion may be along a periphery of the first type holding area. In this case, since the inter-area connecting portion is disposed on the outer periphery of the first type holding area, the arrangement space of the plurality of contacts in the first type holding area may be secured. In addition, since the first type holding area is surrounded by the partition wall and the inter-area connecting portion, the plurality of contacts of the first type holding area can be more isolated from other contacts. Therefore, noise can be suppressed more reliably.

Each of the plurality of contacts may include a connecting portion connected to a conductor of the board, and the connecting portion may face the inter-area connecting portion in a direction along the two partition walls. In this case, noise can be further suppressed by the gap between the inter-area connecting portion and the connecting portion of the contacts.

The partition wall may include an end portion in contact with the board, and may be electrically connected to the ground of the board at the end portion. In this case, noise suppression can be more reliably achieved by strengthening the electrical shielding action of the partition wall.

A connector according to another aspect of the present disclosure is a connector attached to a board and connected to a mating connector. The connector includes: a plurality of conductive contacts each connected to a plurality of conductors of a board, an insulating contact holding portion holding the plurality of contacts, and at least one conductive partition wall that partitions the contact holding portion into a plurality of holding areas. The plurality of holding areas include a first type holding area holding a plurality of contacts for transmitting a plurality of signals and a second type holding area holding one pair of contacts for transmitting one signal and not holding other contacts.

A connector according to an aspect of the present disclosure is a connector attached to a board and connected to a mating connector. The connector includes: a plurality of conductive contacts each connected to a plurality of conductors of a board and an insulating contact holding portion holding the plurality of contacts. The contact holding portion is partitioned into a first type holding area and two second type holding areas sandwiching the first type holding area. The first type holding area holds a plurality of contacts, and the second type holding area holds one contact and does not hold another contact.

According to this connector, a plurality of contacts that are unlikely to be a noise source are collectively disposed in the first type holding area, and contacts that are likely to be a noise source and are likely to be affected by noise are disposed in the second type holding area so as to be isolated from the other contacts. Thus, both downsizing and suppression of noise can be achieved.

The plurality of contacts may include a plurality of first type contacts disposed in the first type holding area and a second type contact disposed in the second type holding area, the second type contact being a type of contacts different from the plurality of first type contacts. In this case, by selectively using the first type holding area and the second type holding area in accordance with the type of contacts, noise can be suppressed more reliably.

The second type contact may be a contact that transmits a higher frequency signal compared to a signal transmitted by the first type contact. In this case, noise may more reliably suppressed by disposing the contact that transmits the higher frequency signal in the second type holding area so as to be isolated from other contacts.

The first type holding area and the two second type holding areas sandwiching the first type holding area may be partitioned by an air gap formed in the contact holding portion. In this case, noise can be more reliably suppressed by disposing the conductive member in the air gap.

Each of the plurality of contacts may include a connecting portion connected to a signal conductor exposing portion of the board, a contact portion contacting a contact of the plug connector, and a linking portion linking the connecting portion and the contact portion, and the plurality of contacts may be disposed such that linking directions of the contact portion and the connecting portion by the linking portion are along the same direction when viewed from the mating connector. In this case, by aligning the direction in which the contact portion and the connecting portion are arranged, downsizing may more reliably be achieved.

Each of the plurality of contacts may have a connecting portion connected to a conductor of the board and a contact portion in contact with a contact of the mating connector, and all of the plurality of contacts may be disposed such that a contact direction between the contact portion and the contacts of the mating connector is along the same direction as viewed from the mating connector. In this case, by aligning the arrangement directions of the contacts and the contacts of the mating connector, the size can be more reliably reduced.

Both the first type holding area and the second type holding area may have a retaining ridge protruding from the base portion toward the mating connector along the same direction, and in both the first type holding area and the second type holding area, the contact portions of all the contacts may be exposed to a side surface of the retaining ridge. In this case, by aligning the arrangement direction of the contacts by the retaining ridge, downsizing may more reliably be achieved.

Both the first type holding area and the second type holding area may have an accommodating groove along the same direction, and in both the first type holding area and the second type holding area, contact portions of all contacts may be disposed to be exposed to the accommodating groove. In this case, by aligning the arrangement direction of the contacts by the accommodating groove, downsizing may more reliably be achieved.

Each of the plurality of contacts may include a connecting portion connected to the conductor of the board, a contact portion contacting the contacts of the mating connector, and a linking portion linking the connecting portion and the contact portion, and a linking direction of the contact portion and the connecting portion by the linking portion of the first type contact and a linking direction of the contact portion and the connecting portion by the linking portion of the second type contact may intersect each other when viewed from the mating connector. Hereinafter, a surface along both a linking direction between the contact portion and the connecting portion by the linking portion of the first type contact and a linking direction between the contact portion and the connecting portion by the linking portion of the second type contact is referred to as a “disposition surface”. In the contacts in which the contact portion and the connecting portion are linked by the linking portion, the width of the side surface (hereinafter referred to as “first side surface”) along the linking direction tends to be larger than the width of the side surface (hereinafter referred to as “second side surface”) perpendicular to the linking direction. Here, the “side surface” means a surface perpendicular to the disposing surface, and the “width” means a width in a direction along the disposing surface. Due to the configuration in which the linking direction of the contact portion and the connecting portion by the linking portion of the first type contact and the linking direction of the contact portion and the connecting portion by the linking portion of the second type contact intersect with each other, it is difficult for the first side surface of the first type contact and the first side surface of the second type contact to face each other in any arrangement. Accordingly, a contacts arrangement suitable for downsizing the connector may be adopted while noise propagation between the first type contact and the second type contact may be suppressed.

When viewed from the mating connector, a linking direction of the contact portion and the connecting portion by the linking portion of the first type contact and a linking direction of the contact portion and the connecting portion by the linking portion of the other first type contact may be parallel to each other. In this case, the first side surface of the first type contact and the first side surface of the other first type contact are opposed to each other, so that the size of the connector may further be reduced.

Each of the plurality of contacts may include a connecting portion connected to the conductor of the board and a contact portion contacting the contact of the mating connector, and a direction in which the contact portion of the first type contact contacts the contact of the mating connector and a direction in which the contact portion of the second type contact contacts the contact of the mating connector intersect each other when viewed from the mating connector. Hereinafter, a combination of contacts (contacts of the own connector) and contacts of the mating connector that contacts the contacts is referred to as a “contact combination”. The direction in which the contacts of the own connector come into contact with the contacts of the mating connector is referred to as a “contact direction”. A surface along both the contact direction of the first type contact and the contact direction of the second type contact is referred to as an “disposing surface”. In the contact combination, the width of the side along the contact direction (hereinafter referred to as “first side surface”) tends to be larger than the width of the side perpendicular to the contact direction (hereinafter referred to as “first side surface”). Here, the “side surface” means a surface perpendicular to the disposing surface, and the “width” means a width in a direction along the disposing surface. Due to the configuration in which the direction in which the contact portion of the first type contact comes into contact with the contacts of the mating connector and the direction in which the contact portion of the second type contact comes into contact with the contacts of the mating connector intersect with each other, it is difficult for the first side surface of the contact combination of the first type contact and the first side surface of the contact combination of the second type contact to face each other in any arrangement. As a result, a contacts arrangement suitable for downsizing the connector may be adopted while suppressing noise propagation between the contact combination of the first type contact and the contact combination of the second type contact.

When viewed from the mating connector, the direction in which the contact portion of the first type contact contacts the contacts of the mating connector and the direction in which the contact portion of the other first type contact contacts the contacts of the mating connector may be parallel to each other. In this case, the first side surface of the contact combination of the first type contact and the first side surface of the contact combination of the other first type contact are opposed to each other, so that the size of the connector may further be reduced.

The first type holding area may include a retaining ridge protruding toward the mating connector from a base portion along one direction, the second type holding area may have a retaining ridge protruding toward the mating connector from a base portion along a direction crossing the one direction, and in both the first type holding area and the second type holding area, the contact portions of all the contacts may be exposed to the side surface of the retaining ridge. In this case, the retaining ridge can more reliably assure that the connection direction of the first type contact and the connection direction of the second type contact intersect, and that the contact direction of the first type contact and the contact direction of the second type contact intersect.

The first type holding area may have an accommodating groove along one direction, the second type holding area may have an accommodating groove along a direction crossing the one direction, and the contact portions of all the contacts may be disposed to be exposed to the accommodating groove in both the first type holding area and the second type holding area. In this case, the accommodating groove can more reliably assure that the connection direction of the first type contact and the connection direction of the second type contact intersect, and that the contact direction of the first type contact and the contact direction of the second type contact intersect.

As viewed from the mating connector, the connecting portions of all contacts may be disposed inwardly of the outer edge of the contact holding portion.

The plurality of contacts disposed in the first type holding area may include a plurality of contacts disposed along an arrangement direction perpendicular to a boundary between the first type holding area and the second type holding area, and an interval between contacts adjacent to each other via the boundary in the arrangement direction may be larger than an interval between contacts adjacent to each other in the arrangement direction in the first type holding area. In this case, by isolating the second type contact from the other contacts, noise can be suppressed more reliably.

As disclosed above, the connector device 1 may comprise a first connector 2 and a second connector 3. The first connector 2 may comprise: a plurality of conductive first contacts 4 configured to be respectively connected to a plurality of conductors of a first board 101; an insulating first contact holding portion 5 holding the plurality of first contacts 4; a conductive partition wall 61 partitioning the first contact holding portion 5 into a first grouping area 51 that holds two or more first contacts 4 and a first individual area 52 that holds one first contact 4 and does not hold another first contact. wherein the partition wall 61 is configured to be electrically connected to a ground conductor of the first board 101; and a conductive first surrounding wall 62 disposed around an outer periphery of the first individual area 52 so that the first surrounding wall 62 and the partition wall 61 at least partially surround the first individual area 52, wherein the first surrounding wall 62 is configured to be electrically connected to the ground conductor of the first board 101. The second connector 3 may comprise: a plurality of conductive second contacts 7 configured to be respectively connected to a plurality of conductors of a second board 102 and respectively contact the plurality of first contacts 4 when the first connector 2 and the second connector 3 are fitted to each other; and a conductive second surrounding wall 81A,81B,82A,82B configured to be electrically connected to a ground conductor of the second board 102. When the first connector 2 and the second connector 3 are fitted to each other, the second surrounding wall 81A, 81B,82A,82B may be disposed inside or outside the first surrounding wall 62 around the outer periphery of the first individual area 52.

The first connector 2 may further comprise an additional conductive partition wall 61 and an additional conductive first surrounding wall 62. The second connector 3 may further comprise an additional conductive second surrounding wall 81A,81B,82A,82B. The partition wall 61 and the additional partition wall 61 may partition the first contact holding portion 5 into the first grouping area 51, the first individual area 52, and an additional first individual area 52, so that the first grouping area 51 is positioned between the first individual area 52 and the additional first individual area 52. The additional first surrounding wall 62 may be disposed around an outer periphery of the additional first individual area 52 so that the additional first surrounding wall 62 and the additional partition wall 61 at least partially surround the additional first individual area 52. When the first connector 2 and the second connector 3 are fitted to each other, the additional second surrounding wall 81A,81B,82A, 82B may be disposed inside or outside the additional first surrounding wall 62 around the outer periphery of the additional first individual area 52.

The first connector 2 may further comprise a conductive first inter-area connecting portion 64 disposed around an outer periphery of the first grouping area 51, so that the first inter-area connecting portion 64, the partition wall 61, and the additional partition wall 61 at least partially surround the first grouping area 51.

The first inter-area connecting portion 64 may connect the first surrounding wall 62 to the additional first surrounding wall 62.

The second connector 3 may further comprise a conductive second inter-area connecting portion 81A,81B connecting the second surrounding wall 81A,81B,82A,82B to the additional second surrounding wall 81A,81B,82A,82B. When the first connector 2 and the second connector 3 are fitted to each other, the second inter-area connecting portion 81A,81B may be disposed around an outer periphery of the first grouping area 51 so that the second inter-area connecting portion 81A,81B, the partition wall 61, and the additional partition wall 61 at least partially surround the first grouping area 51.

The first connector 2 may further comprise a conductive first inter-area connecting portion 64 disposed around an outer periphery of the first grouping area 51 so that the first inter-area connecting portion 64, the partition wall 61, and the additional partition wall 61 may at least partially surround the first grouping area 51. The second connector 3 may further comprise a conductive second inter-area connecting portion 81A,81B connecting the second surrounding wall 81A,81B,82A,82B to the additional second surrounding wall 81A,81B,82A,82B. When the first connector 2 and the second connector 3 are fitted to each other, the second inter-area connecting portion 81A,81B may be disposed inside or outside the first inter-area connecting portion 64 around the outer periphery of the first grouping area 51.

The second connector 3 may further comprise an insulating second contact holding portion 9 holding the plurality of second contacts 7. The second contact holding portion 9 may comprises a second grouping area 91 holding two or more second contacts 7 corresponding to the two or more first contacts 4 of the first grouping area 51; and a second individual area 92 holding one second contact corresponding to the one first contact 4 of the first individual area 52. When the second connector 3 is apart from the first connector 2, the second grouping area 91 and the second individual area 92 may not be partitioned by a conductive member, and when the first connector 2 and the second connector 3 are fitted to each other, the second grouping area 91 and the second individual area 92 are partitioned by the partition wall 61.

The first connector 2 may further comprise a conductive intra-area connecting portion 63 disposed around the first individual area 52 and electrically connecting the partition wall 61 to the first surrounding wall 62.

The intra-area connecting portion 63 may extend across a connection direction of the first connector 2 and the second connector 3.

The intra-area connecting portion 63 may extend to cover the first individual area 52 and face the second connector 3.

The intra-area connecting portion 63 may comprise an opening exposing the one first contact 4 toward the second connector 3.

The first surrounding wall 62 may be divided into two or more first wall portions disposed around the outer periphery of the first individual area 52.

When the first connector 2 and the second connector 3 are fitted to each other, one or more gaps between the two or more first wall portions may be covered by the second surrounding wall 81A,81B,82A,82B and each of the two or more first wall portions may contact the second surrounding wall 81A,81B,82A,82B.

The second surrounding wall 81A,81B,82A,82B may be divided into two or more second wall portions. When the first connector 2 and the second connector 3 are fitted to each other, the two or more second wall portions may be disposed around the outer periphery of the first individual area 52.

When the first connector 2 and the second connector 3 are fitted to each other, one or more gaps between the two or more second wall portions may be covered by the first surrounding wall 62, and each of the second wall portions may contact the first surrounding wall 62.

The partition wall 61 may comprise an end edge exposed from the first contact holding portion 5 to contact the ground conductor of the first board 101.

When the first connector 2 and the second connecter are fitted to each other, the second surrounding wall 81A,81B, 82A,82B may be disposed outside the first surrounding wall 62.

The first contact holding portion 5 may comprise: a recess formed on an outer periphery of the first contact holding portion 5 around the first grouping area 51; and a through hole formed in the first individual area 52. Each of the plurality of first contacts 4 may comprise: a connecting portion configured to be connected to the ground conductor of the first board 101; and a contact portion that contacts one of the plurality of second contacts 7 when the first connector 2 and the second connector 3 are fitted to each other. The connecting portion of each of the two or more first contacts 4 of the first grouping area 51 may be exposed into the recess, and the connecting portion of the one first contact 4 of the first individual area 52 may be exposed into the through hole.

Additionally, an example connector device 1 is disclosed herein. The connector device 1 may comprise a first connector 2 and a second connector 3. The first connector 2 may comprise: a plurality of conductive first contacts 4 configured to be respectively connected to a plurality of conductors of a first board 101; an insulating first contact holding portion 5 holding the plurality of first contacts 4; a conductive partition wall 61 partitioning the first contact holding portion 5 into a first grouping area 51 that holds three or more first contacts 4, and a first individual area 52 that holds a pair of first contacts 4 for transmitting one signal and does not hold another first contact, wherein the partition wall 61 is configured to be electrically connected to a ground conductor of the first board 101; and a conductive first surrounding wall 62 disposed around an outer periphery of the first individual area 52 so that the first surrounding wall 62 and the partition wall 61 at least partially surround the first individual area 52, wherein the first surrounding wall 62 is configured to be electrically connected to the ground conductor of the first board 101. The second connector 3 may comprise: a plurality of conductive second contacts 7 configured to be respectively connected to a plurality of conductors of a second board 102 and respectively contact the plurality of first contacts 4 when the first connector 2 and the second connector 3 are fitted to each other; and a conductive second surrounding wall 81A,81B,82A,82B configured to be electrically connected to a ground conductor of the second board 102. When the first connector 2 and the second connector 3 are fitted to each other, the second surrounding wall 81A,81B,82A,82B may be disposed inside or outside the first surrounding wall 62 around the outer periphery of the first individual area 52.

The first connector 2 may further comprise an additional conductive partition wall 61 and an additional conductive first surrounding wall 62. The second connector 3 may further comprise an additional conductive second surrounding wall 81A,81B,82A,82B. The partition wall 61 and the additional partition wall 61 may partition the first contact holding portion 5 into the first grouping area 51, the first individual area 52, and an additional first individual area 52, so that the first grouping area 51 is positioned between the first individual area 52 and the additional first individual area 52. The additional first surrounding wall 62 may be disposed around an outer periphery of the additional first individual area 52 so that the additional first surrounding wall 62 and the additional partition wall 61 at least partially surround the additional first individual area 52. When the first connector 2 and the second connector 3 are fitted to each other, the additional second surrounding wall 81A,81B,82A, 82B is disposed inside or outside the additional first surrounding wall 62 around the outer periphery of the additional first individual area 52.

It is to be understood that not all aspects, advantages and features described herein may necessarily be achieved by, or included in, any one particular example. Indeed, having described and illustrated various examples herein, it should be apparent that other examples may be modified in arrangement and detail.

What is claimed is:

1. A connector device comprising a first connector and a second connector configured to be fitted to the first connector along a connection direction, wherein the first connector comprises:

a plurality of conductive first contacts configured to be respectively connected to a plurality of conductors of a first board;

an insulating first contact holding portion holding the plurality of first contacts;

a conductive partition wall partitioning the first contact holding portion into a first grouping area that holds two or more first contacts and a first individual area that holds one first contact and does not hold another first contact, wherein the partition wall is configured to be electrically connected to a ground conductor of the first board; and a conductive first surrounding wall disposed around an outer periphery of the first individual area so that the first surrounding wall and the partition wall at least partially surround the first individual area, wherein the first surrounding wall is configured to be electrically connected to the ground conductor of the first board, wherein the second connector comprises:

a plurality of conductive second contacts configured to be respectively connected to a plurality of conductors of a second board and respectively contact the plurality of first contacts when the first connector and the second connector are fitted to each other; and a conductive second surrounding wall configured to be electrically connected to a ground conductor of the second board, wherein each of the plurality of first contacts comprises:

a first connecting portion for being connected to one of the plurality of conductors of the first board;

a first contact portion that contacts one of the plurality of second contacts when the first connector and the second connector are fitted to each other; and a first linking portion that links the first connecting portion and the first contact portion along a first linking direction, and wherein the first linking direction in the first individual area intersects with the first linking direction in the first grouping area when viewed from the connection direction.

2. The connector device according to claim 1, wherein each of the plurality of second contacts comprises:

a second connecting portion for being connected to one of the plurality of conductors of the second board;

a second contact portion that contacts one of the plurality of first contacts when the first connector and the second connector are fitted to each other; and a second linking portion that links the second connecting portion and the second contact portion along a second linking direction, and wherein the second linking direction in the first individual area intersects with the second linking direction in the first grouping area when viewed from the connection direction.

3. The connector device according to claim 1, wherein the first connector further comprises an additional conductive partition wall and an additional conductive first surrounding wall, wherein the second connector further comprises an additional conductive second surrounding wall, wherein the partition wall and the additional partition wall partition the first contact holding portion into the first grouping area, the first individual area, and an additional first individual area, so that the first grouping area is positioned between the first individual area and the additional first individual area, wherein the additional first surrounding wall is disposed around an outer periphery of the additional first individual area so that the additional first surrounding wall and the additional partition wall at least partially surround the additional first individual area, and wherein the first linking direction in the additional first individual area intersects with the first linking direction in the first grouping area when viewed from the connection direction.

4. The connector device according to claim 3, wherein the first connector further comprises a conductive first inter-area connecting portion disposed around an outer periphery of the first grouping area, so that the first inter-area connecting portion, the partition wall, and the additional partition wall at least partially surround the first grouping area.

5. The connector device according to claim 4, wherein the first inter-area connecting portion connects the first surrounding wall to the additional first surrounding wall.

6. The connector device according to claim 3, wherein the second connector further comprises a conductive second inter-area connecting portion connecting the second surrounding wall to the additional second surrounding wall, and wherein when the first connector and the second connector are fitted to each other, the second inter-area connecting portion is disposed around an outer periphery of the first grouping area so that the second inter-area connecting portion, the partition wall, and the additional partition wall at least partially surround the first grouping area.

7. The connector device according to claim 3, wherein the first connector further comprises a conductive first inter-area connecting portion disposed around an outer periphery of the first grouping area so that the first inter-area connecting portion, the partition wall, and the additional partition wall at least partially surround the first grouping area, wherein the second connector further comprises a conductive second inter-area connecting portion connecting the second surrounding wall to the additional second surrounding wall, and wherein when the first connector and the second connector are fitted to each other, the second inter-area connecting portion is disposed inside or outside the first inter-area connecting portion around the outer periphery of the first grouping area.

8. The connector device according to claim 1, wherein the second connector further comprises an insulating second contact holding portion holding the plurality of second contacts, wherein the second contact holding portion comprises:

a second grouping area holding two or more second contacts corresponding to the two or more first contacts of the first grouping area; and a second individual area holding one second contact corresponding to the one first contact of the first individual area, wherein when the second connector is apart from the first connector, the second grouping area and the second individual area are not partitioned by a conductive member, and wherein when the first connector and the second connector are fitted to each other, the second grouping area and the second individual area are partitioned by the partition wall.

9. The connector device according to claim 1, wherein the first connector further comprises a conductive intra-area connecting portion disposed around the first individual area and electrically connecting the partition wall to the first surrounding wall.

10. The connector device according to claim 9, wherein the intra-area connecting portion extends across a connection direction of the first connector and the second connector.

11. The connector device according to claim 10, wherein the intra-area connecting portion extends to cover the first individual area and face the second connector.

12. The connector device according to claim 11, wherein the intra-area connecting portion comprises an opening exposing the one first contact toward the second connector.

13. The connector device according to claim 1, wherein the first surrounding wall is divided into two or more first wall portions disposed around the outer periphery of the first individual area.

14. The connector device according to claim 13, wherein when the first connector and the second connector are fitted to each other, one or more gaps between the two or more first wall portions are covered by the second surrounding wall, and each of the two or more first wall portions contacts the second surrounding wall.

15. The connector device according to claim 1, wherein the second surrounding wall is divided into two or more second wall portions, and wherein when the first connector and the second connector are fitted to each other, the two or more second wall portions are disposed around the outer periphery of the first individual area.

16. The connector device according to claim 15, wherein when the first connector and the second connector are fitted to each other, one or more gaps between the two or more second wall portions are covered by the first surrounding wall, and each of the second wall portions contacts the first surrounding wall.

17. The connector device according to claim 1, wherein the partition wall comprises an end edge exposed from the first contact holding portion to contact the ground conductor of the first board.

18. The connector device according to claim 1, wherein when the first connector and the second connector are fitted to each other, the second surrounding wall is disposed outside the first surrounding wall.

19. A connector device comprising a first connector and a second connector configured to be fitted to the first connector along a connection direction, wherein the first connector comprises:

a plurality of conductive first contacts configured to be respectively connected to a plurality of conductors of a first board;

an insulating first contact holding portion holding the plurality of first contacts;

a conductive partition wall partitioning the first contact holding portion into a first grouping area that holds three or more first contacts, and a first individual area that holds a pair of first contacts for transmitting one signal and does not hold another first contact, wherein the partition wall is configured to be electrically connected to a ground conductor of the first board; and a conductive first surrounding wall disposed around an outer periphery of the first individual area so that the first surrounding wall and the partition wall at least partially surround the first individual area, wherein the first surrounding wall is configured to be electrically connected to the ground conductor of the first board, wherein the second connector comprises:

a plurality of conductive second contacts configured to be respectively connected to a plurality of conductors of a second board and respectively contact the plurality of first contacts when the first connector and the second connector are fitted to each other; and a conductive second surrounding wall configured to be electrically connected to a ground conductor of the second board wherein each of the plurality of first contacts comprises:

a first connecting portion for being connected to one of the plurality of conductors of the first board;

a first contact portion that contacts one of the plurality of second contacts when the first connector and the second connector are fitted to each other; and a first linking portion that links the first connecting portion and the first contact portion along a first linking direction, and wherein the first linking direction in the first individual area intersects with the first linking direction in the first grouping area when viewed from the connection direction.

20. The connector device according to claim 19, wherein each of the plurality of second contacts comprises:

a second connecting portion for being connected to one of the plurality of conductors of the second board;

a second contact portion that contacts one of the plurality of first contacts when the first connector and the second connector are fitted to each other; and a second linking portion that links the second connecting portion and the second contact portion along a second linking direction, and wherein the second linking direction in the first individual area intersects with the second linking direction in the first grouping area when viewed from the connection direction.

* * * * *